(12) United States Patent
Herrmann et al.

(10) Patent No.: US 12,198,577 B2
(45) Date of Patent: Jan. 14, 2025

(54) DECORATIVE FILM, DECORATIVE FILM BODY, DISPLAY BODY AND METHODS FOR PRODUCTION THEREOF

(71) Applicant: LEONHARD KURZ Stiftung & Co. KG, Fürth (DE)

(72) Inventors: Bernd Herrmann, Zirndorf (DE); Michael Otto Ucke, Leonstein (AT)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 0 days.

(21) Appl. No.: 17/768,729

(22) PCT Filed: Sep. 30, 2020

(86) PCT No.: PCT/EP2020/077395
§ 371 (c)(1),
(2) Date: Apr. 13, 2022

(87) PCT Pub. No.: WO2021/073876
PCT Pub. Date: Apr. 22, 2021

(65) Prior Publication Data
US 2024/0177635 A1    May 30, 2024

(30) Foreign Application Priority Data
Oct. 14, 2019   (DE) .......................... 102019127630.6

(51) Int. Cl.
*B32B 3/10*      (2006.01)
*B32B 7/12*      (2006.01)
(Continued)

(52) U.S. Cl.
CPC ............... *G09F 19/12* (2013.01); *B32B 7/12* (2013.01); *B32B 38/145* (2013.01); *G09F 9/33* (2013.01);
(Continued)

(58) Field of Classification Search
CPC .... B32B 3/00; B32B 3/08; B32B 3/26; B32B 3/266; B32B 7/12; B32B 3/10; B32B 3/14; B32B 3/263; G09F 13/06; G09F 19/12
See application file for complete search history.

(56) References Cited

U.S. PATENT DOCUMENTS

2006/0066579 A1    3/2006  Bladt
2013/0329166 A1   12/2013  Poliakine et al.
(Continued)

FOREIGN PATENT DOCUMENTS

CN          1255269 C       5/2006
CN        201111803 Y       9/2008
(Continued)

OTHER PUBLICATIONS

Taiwanese Office Action dated Mar. 13, 2024.
(Continued)

*Primary Examiner* — Elizabeth E Mulvaney
(74) *Attorney, Agent, or Firm* — Hoffmann & Baron, LLP

(57) ABSTRACT

A decorative film (1) for application to a dynamically actuatable display (7), including:
  a carrier ply (2),
  a first decorative ply (3),
  wherein, in a display area (5), the first decorative ply (3) has a first decoration (31) and one or more transparent areas (4), in which the decorative film (1) is permeable to light emitted by the dynamically actuatable display (7).
A decorative film body (10) and a display body (20) with the decorative film (1) as well as methods for the production thereof.

57 Claims, 19 Drawing Sheets

(51) Int. Cl.
  *B32B 38/00*  (2006.01)
  *G09F 9/33*  (2006.01)
  *G09F 13/06*  (2006.01)
  *G09F 19/12*  (2006.01)

(52) U.S. Cl.
  CPC ........ *G09F 13/06* (2013.01); *B32B 2307/412* (2013.01); *B32B 2457/20* (2013.01)

(56) References Cited

U.S. PATENT DOCUMENTS

| | | | |
|---|---|---|---|
| 2014/0192013 | A1 | 7/2014 | Lubert et al. |
| 2018/0111569 | A1 | 4/2018 | Faik et al. |
| 2018/0348900 | A1 | 12/2018 | Heinrich et al. |
| 2019/0063722 | A1 | 2/2019 | Sugiyama et al. |
| 2019/0180655 | A1 | 6/2019 | Haid |
| 2019/0180665 | A1 | 6/2019 | Zhang |
| 2020/0215846 | A1 | 7/2020 | Ordung et al. |
| 2020/0241675 | A1 | 7/2020 | Oki et al. |
| 2020/0369223 | A1* | 11/2020 | Hansen .................... B32B 9/02 |

FOREIGN PATENT DOCUMENTS

| | | | |
|---|---|---|---|
| CN | 103298623 | A | 9/2013 |
| CN | 103635622 | | 3/2014 |
| CN | 103635622 | A | 3/2014 |
| CN | 107182175 | | 9/2017 |
| CN | 107182175 | A | 9/2017 |
| CN | 209249007 | | 8/2019 |
| CN | 209249007 | U | 8/2019 |
| DE | 10329188 | A1 | 1/2005 |
| DE | 102007013078 | A1 | 9/2008 |
| DE | 102009032815 | A1 | 1/2011 |
| DE | 102010051166 | A1 | 10/2011 |
| DE | 10 2016 218 916 | A1 | 3/2018 |
| DE | 102016219288 | A1 | 4/2018 |
| DE | 10 2017 118 579 | A1 | 2/2019 |
| DE | 102018119967 | A1 | 2/2019 |
| JP | 2002023670 | A | 1/2002 |
| JP | 2002040952 | A | 2/2002 |
| JP | 2005-062441 | A | 3/2005 |
| JP | 2007271862 | A | 10/2007 |
| JP | 2012-155143 | | 8/2012 |
| JP | 2012-155143 | A | 8/2012 |
| TW | 201419085 | A | 5/2014 |
| WO | 03/037616 | A1 | 5/2003 |
| WO | 2004077388 | A1 | 9/2004 |
| WO | 2015034509 | A1 | 3/2015 |
| WO | 2017/093066 | A1 | 6/2017 |
| WO | 2019/082399 | A1 | 5/2019 |
| WO | 2019165441 | A1 | 8/2019 |

OTHER PUBLICATIONS

German Office Action of Apr. 11, 2023.
International Search report, No. PCT/EP2020/077395, dated Dec. 10, 2020.
German Examination Report dated Aug. 31, 2020.
Chinese Office Action dated Sep. 23, 2023.
Chinese Office Action dated Sep. 6, 2024.
Japanese Office Action dated Jul. 2, 2024.

* cited by examiner

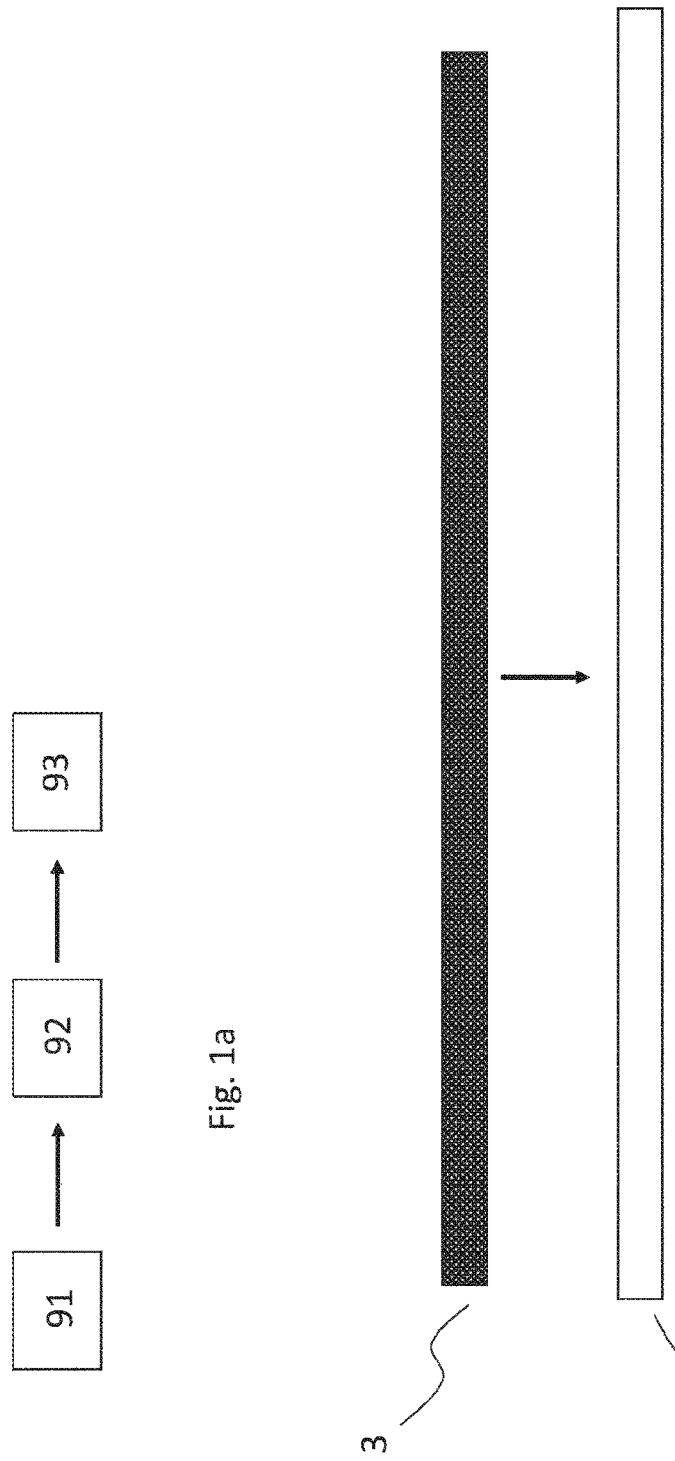

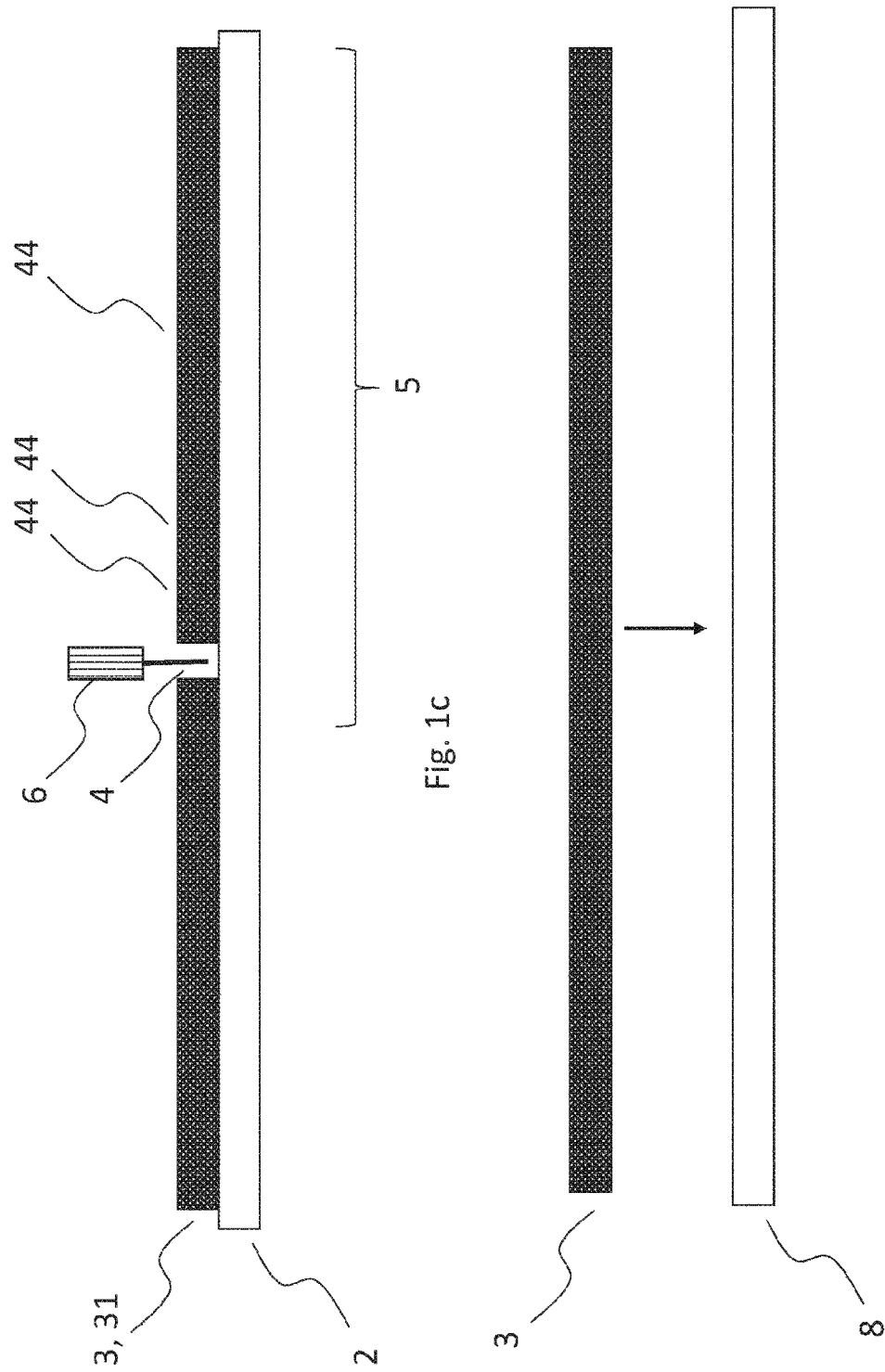

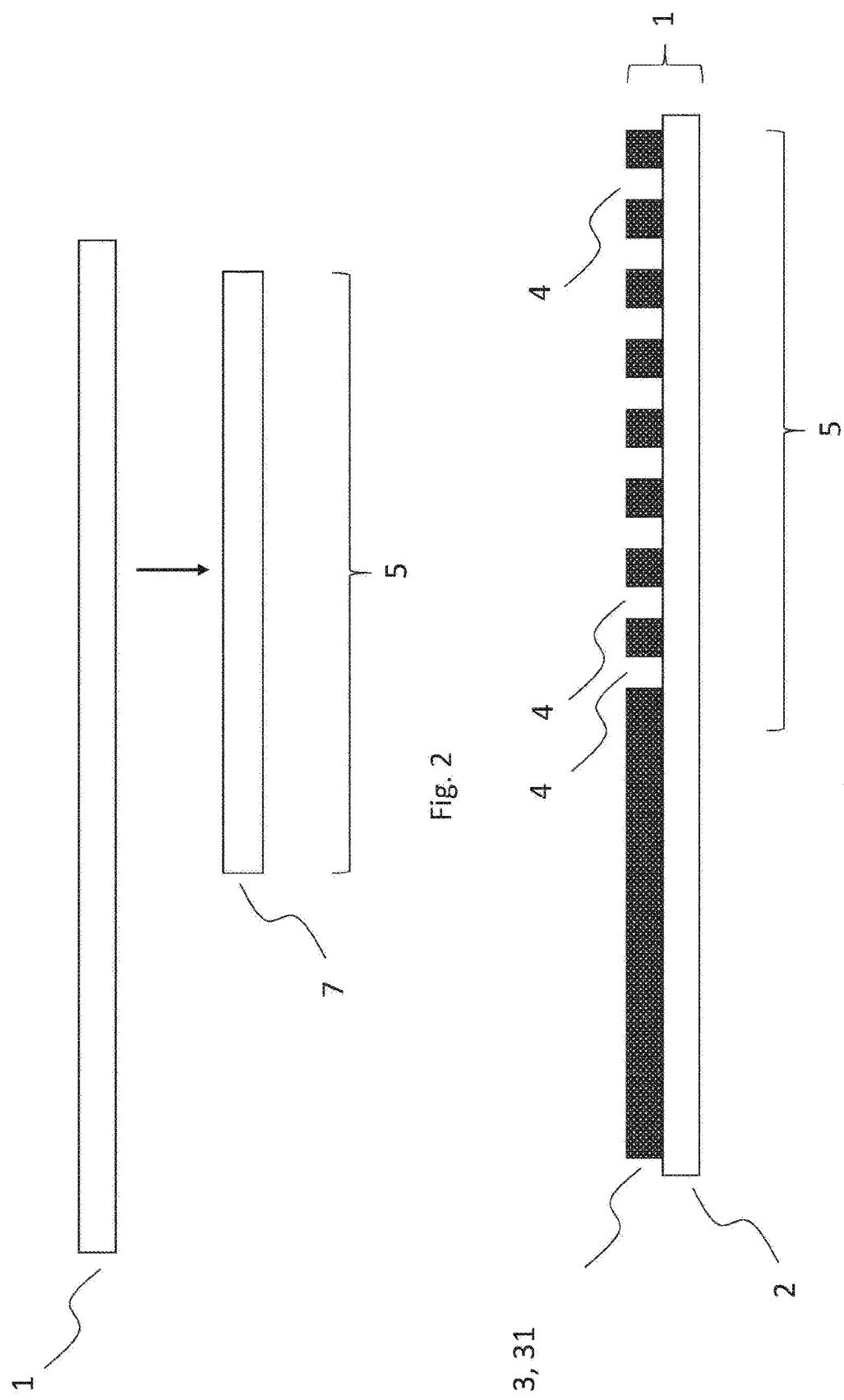

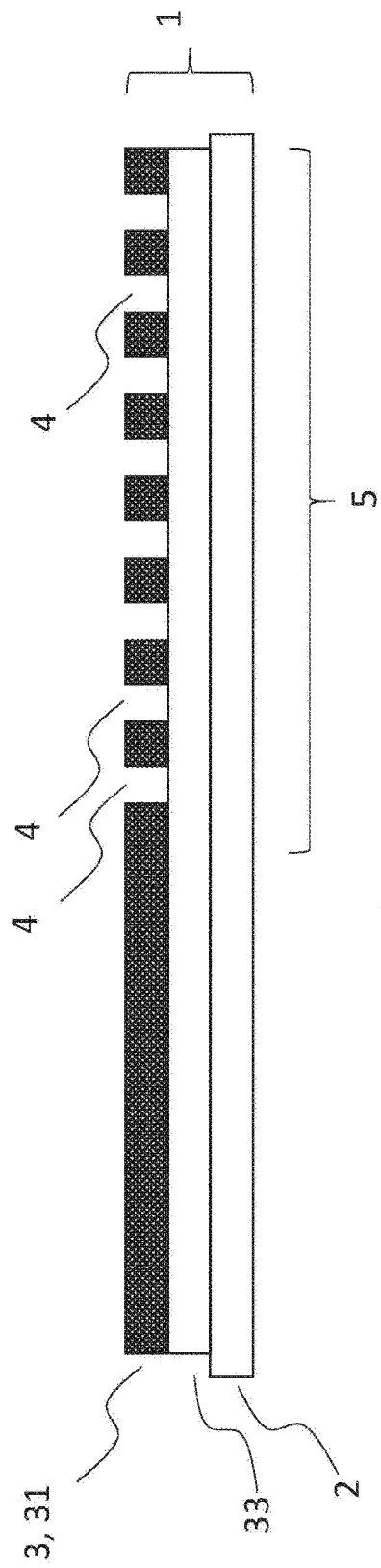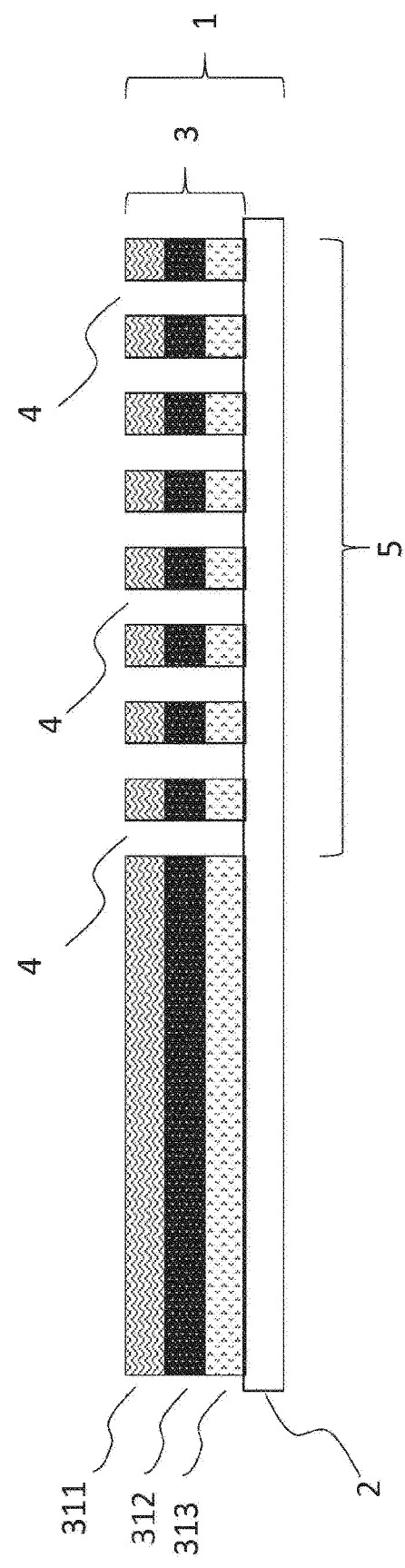

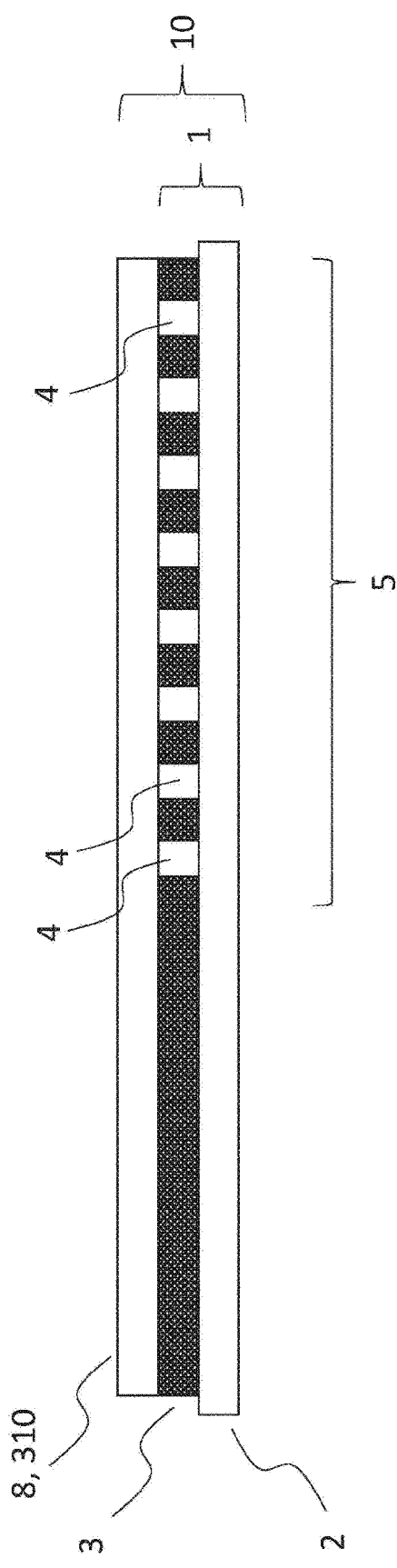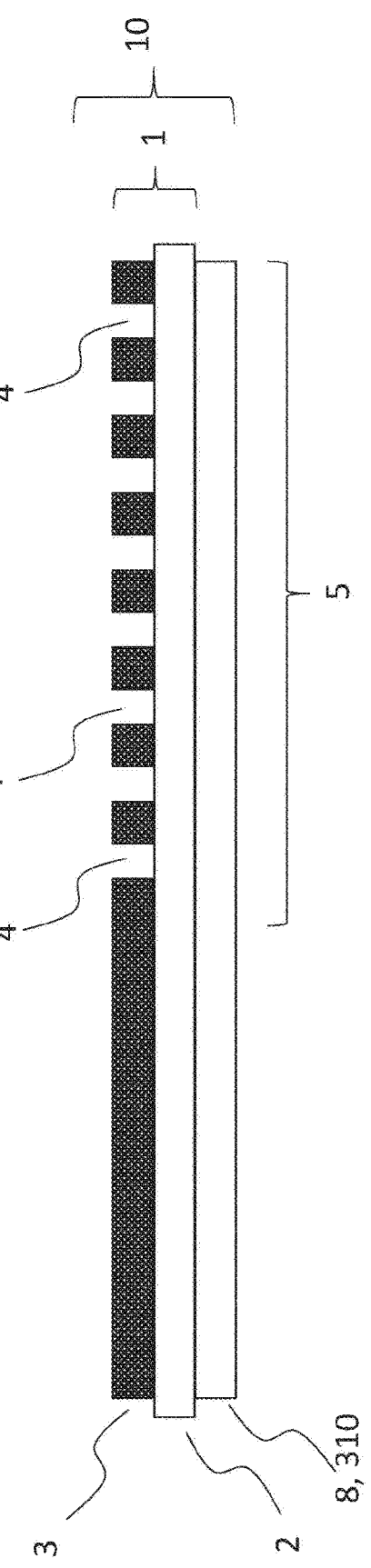

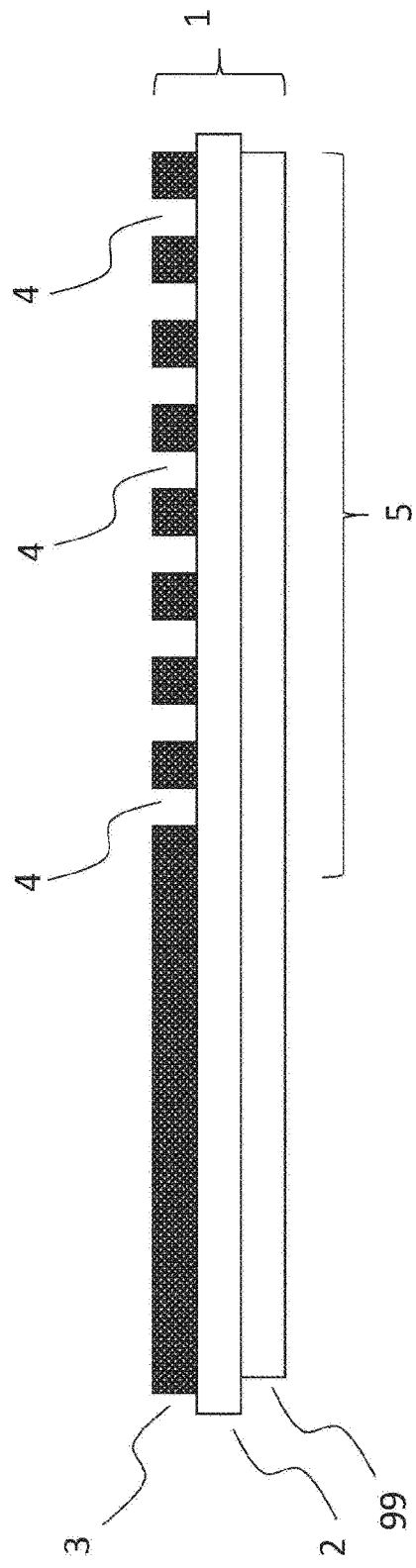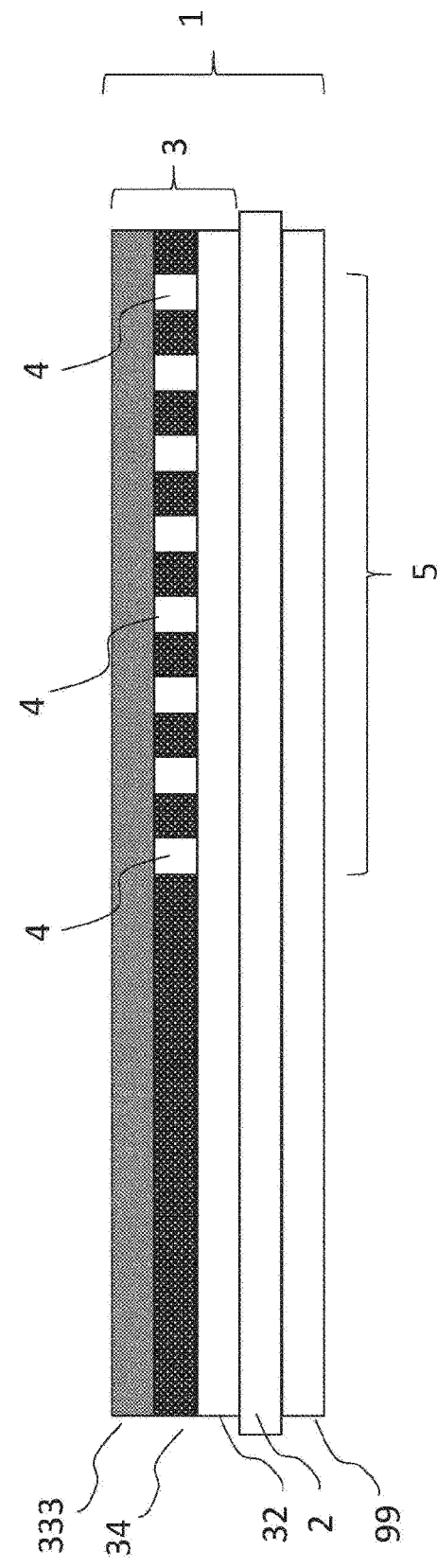
Fig. 11a
Fig. 11b

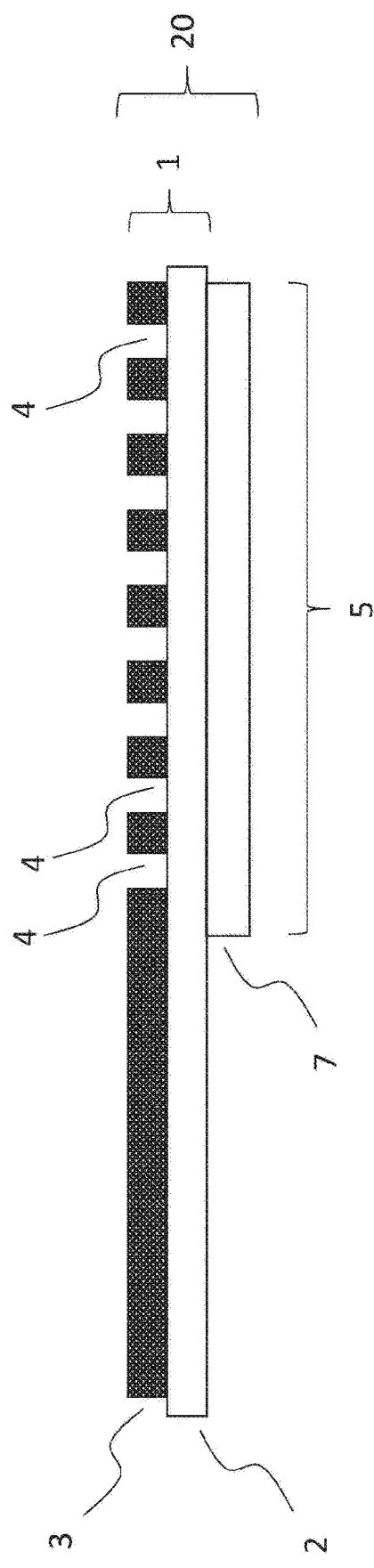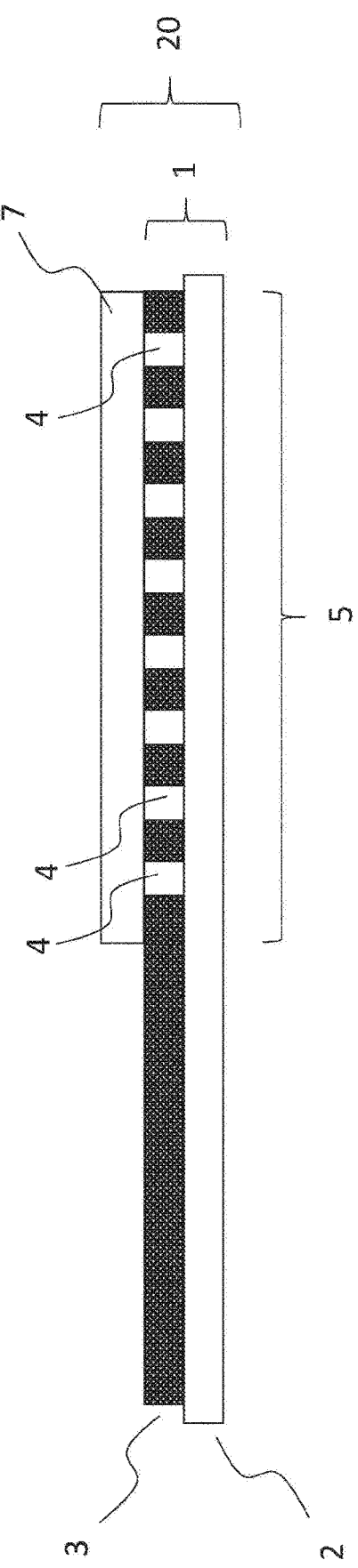
Fig. 13a
Fig. 13b

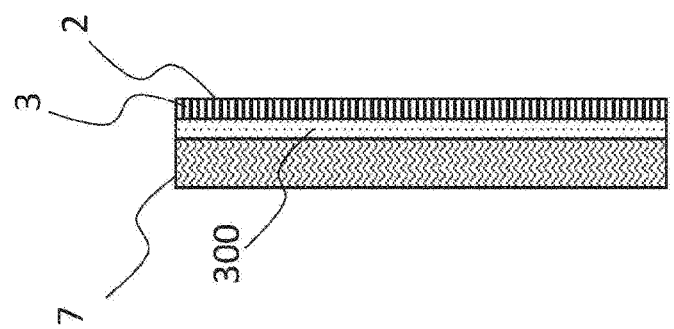
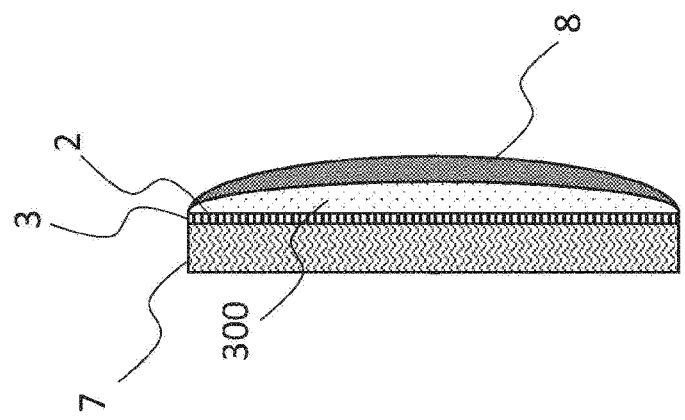

DECORATIVE FILM, DECORATIVE FILM BODY, DISPLAY BODY AND METHODS FOR PRODUCTION THEREOF

This application is a National Stage application based on an International Application filed under the Patent Cooperation Treaty, PCT/EP2020/077395, filed Sep. 30, 2020, which claims priority to DE 102019127630.6, filed Oct. 14, 2019.

BACKGROUND OF THE INVENTION

The invention relates to a decorative film, a decorative film body and a display body as well as methods for the production thereof.

It is known to introduce symbol-shaped cuts in a decorative film and to place the decorative film in front of a light source, with the result that a symbol appears for an observer when the light source is switched on. Here, the shaping of this symbol is tied to the shape of the cuts.

Further, it is known to place screens behind or in a frame-shaped decorative film. Around the screen or neighboring the screen, the decorative film thus shows static motifs and the surface inside the frame merely acts as the display surface of the screen. The display surface does not take on further functions here.

SUMMARY OF THE INVENTION

The object of the present invention is thus to specify an improved decorative film, an improved decorative film body and an improved display body as well as methods for the production thereof.

The object is achieved by a decorative film for application to a dynamically actuatable display, comprising:
  a carrier ply,
  a first decorative ply.

In a display area the first decorative ply has a first decoration and one or more transparent areas. In the one or more transparent areas the decorative film is permeable to light emitted by the dynamically actuatable display.

The object is further achieved by a decorative film body for application to a dynamically actuatable display with a decorative film according to the present invention. The decorative film body is characterized in that it comprises a further decorative ply. In particular, the further decorative ply is applied to a side of the first decorative ply facing away from the carrier ply or a side of the carrier ply facing away from the first decorative ply.

The object is further achieved by a display body. The display body comprises a dynamically actuatable display and a decorative film according to the present invention or the display body comprises a dynamically actuatable display and a decorative film body according to the present invention.

The object is further achieved by means of a method for producing a decorative film, in particular according to the present invention, for application to a dynamically actuatable display comprising the following steps, preferably in the specified sequence:
  providing a carrier ply,
  applying a first decorative ply to the carrier ply, wherein the first decorative ply has a first decoration in a display area,
  generating one or more transparent areas in the display area, wherein in the one or more transparent areas the decorative film is permeable to light emitted by the dynamically actuatable display.

Further, the object is achieved by a method, in particular comprising a method according to the present invention, for producing a decorative film body, preferably according to the present invention, for application to a dynamically actuatable display, wherein the first decorative ply is joined to a further decorative ply.

In particular, the first decorative ply is joined to the further decorative ply by means of hot stamping, hot lamination, cold stamping, lamination, lining, adhering and/or injection molding, in particular in-mold decoration and/or back-injection molding.

The object is further achieved by a method, in particular comprising a method according to the present invention, for producing a display body, preferably according to the present invention, comprising the following steps:
  providing a decorative film according to the present invention or a decorative film body according to the present invention,
  joining the decorative film or the decorative film body to a dynamically actuatable display, in particular by means of hot stamping, hot lamination, cold stamping, lamination, lining, adhering and/or injection molding, in particular in-mold decoration and/or back-injection molding.

The object is further achieved by a use of a decorative film according to the present invention and/or a decorative film body according to the present invention as an insert, hot-stamping film and/or in-mold film, in particular as an in-mold decoration film, in-mold labeling film and/or print mold design film.

The object is further achieved by a use of a decorative film according to the present invention, a display body according to the present invention and/or a decorative film body according to the present invention as one of or in one of the following articles:
  vehicle exterior part, in particular front panel, preferably radiator grille, side panel, preferably B pillar, rear panel, paneling and/or roof attachment, preferably as an advertisement, information display and/or warning,
  vehicle interior part, in particular as a dashboard, dashboard element, door panel, door panel element, warning and/or information display,
  household appliance, in particular refrigerator, washing machine, dishwasher and/or cooker—piece of furniture,
  information display, in particular advertisement.

By means of the decorative film, the decorative film body and the display body as well as the use thereof and methods for the production thereof, the advantage is achieved for example that a dynamically actuatable display can be enhanced by a static motif generated in particular by the first decoration. This static motif is preferably also visible in the display area without energy consumption of the dynamically actuatable display and it preferably makes it possible that the dynamically actuatable display can be optically hidden. An optical shielding of the dynamically actuatable display is thus made possible in particular. In the display area it is preferably also possible that dynamic motifs can also be displayed in addition to static motifs in particular by means of the dynamically actuatable display, and in particular that a static motif can be optically hidden by means of the dynamically actuatable display.

Optically hidden means in particular put in a state that is not discernible or is difficult to discern for the human eye. A decoration is preferably used to form a motif. If a decoration is optically hidden, the motif to be formed is in particular optically hidden for the human eye and thus preferably is not discernible or is difficult to discern.

By a static motif is meant here in particular a motif which is preferably discernible for the human eye without the aid of optical equipment and which preferably does not itself move and/or the shaping of which that is discernible for the human eye, for example contours and/or edges, has no movement.

By a motif is meant for example a pattern. A pattern is in particular a graphically designed outline, a figurative representation, an image, a symbol, a logo, a portrait, an alphanumeric character, a text, a gridding and/or the like or a combination of one or more of the above patterns.

A static motif is in particular also a homogeneous colored surface that is preferably discernible for the human eye without the aid of optical equipment, an optical appearance of wood, metal and/or stone. A static motif preferably has less than one image change per second, in particular less than 5 image changes per second. In particular, a static motif has less than 10 different single images, preferably with different shapes.

Dynamic motifs are in particular moving images, preferably animations, movies and/or videos. A moving image is in particular a sequence of images which generate the illusion of movement by displaying to the observer at short time intervals preferably with suitable technology. A dynamic motif is in particular an image sequence with more than one image change per second, preferably with more than 5 image changes per second. An image change is preferably expressed at least in a movement of a shaping that is discernible for the human eye, for example of contours and/or edges. In particular, a dynamic motif has more than 10, in particular more than 100, preferably more than 1,000 different single images, preferably with different shapes.

A further advantage of the invention is that a high degree of flexibility is achieved in the possibility of displaying different static motifs and/or dynamic motifs. For example, with respect to conventional backlit cuts for generating static motifs, in particular it is made possible that the shaping of a motif that is discernible for the human eye is not or is only slightly limited by the shaping of the one or more transparent areas, for example in the form of cuts.

It is furthermore possible that the decorative film and/or the decorative film body takes on a protective function for the dynamically actuatable display, in particular against mechanical, chemical and/or radiation-caused effects. It is thus possible that a comparatively sensitive display is usable under more challenging environmental conditions, for example outdoors, and/or that the durability is improved.

A ply and/or a layer is in particular a substantially flat structure and is preferably itself single- or multi-layered.

Advantageous embodiments of the invention are described in the dependent claims.

The display area, in particular in the case of an observation perpendicular to a plane spanned by the decorative film, is preferably delimited by an outline around the one or more transparent areas and/or defined by an area to which the dynamically actuatable display has been, is or is to be applied. It is possible in particular that the decorative film body and/or the display body is for example one component, preferably with one or more curved surfaces, preferably on at least an outside of the component.

In the one or more transparent areas the decorative film is permeable in particular to light emitted by the dynamically actuatable display, because the one or more transparent areas are semi-transparent or transparent and/or have a transparence in the visible wavelength range of at least 0.5%, preferably of at least 1%.

By semi-transparent is preferably meant a transmissivity in the visible wavelength range of between 15% and 60% and by transparent is preferably meant a transmissivity in at least one partial range in the visible wavelength range of more than 60%. By opaque is preferably meant a transmissivity in the visible wavelength range of less than 15%.

By the one or more transparent areas of the first decorative ply is meant here in particular one or more areas in which the first decorative ply has been or is removed. It is also possible that in the one or more transparent areas the opacity of the first decorative ply has been or is reduced, in particular in relation to surrounding areas of the first decorative ply, and/or the transparence of the first decorative ply has been or is increased, in particular in relation to surrounding areas of the first decorative ply. It is further conceivable that the one or more transparent areas are formed by one continuous transparent area or several transparent areas separated from each other.

The one or more transparent areas are preferably openings, apertures, cuts, gaps and/or holes in the first decorative ply. The one or more transparent areas preferably are or have been generated by introducing and/or leaving behind openings, apertures, cuts, gaps and/or holes, preferably at least in the first decorative ply. In particular, it is possible that the one or more transparent areas are perforated and/or form a perforation, preferably of the first decorative ply. The one or more transparent areas preferably penetrate at least one and/or all layers of the first decorative ply.

The one or more transparent areas preferably are or have been generated by means of a cutting tool, in particular by means of lasers, and/or lift-off, preferably in a regular one- or two-dimensional pattern, preferably hole pattern.

The cutting tool is preferably a laser, in particular set up as a $CO^2$ laser or set up as a YAG solid-state laser. The power of the $CO^2$ laser expediently lies in a range of from watts to 50 watts, preferably in a range of from 5 watts to 25 watts. The speed of the $CO^2$ laser, in particular the travel speed of the laser source of the $CO^2$ laser, preferably lies in a range of from 2 mm/s to 100 mm/s, preferably in a range of from 2 mm/s to 50 mm/s. The wavelength, in particular the peak wavelength, of the laser, preferably set up as a $CO^2$ laser, is preferably 1,060 nm.

The power of the YAG solid-state laser expediently lies in a range of from 5 watts to 50 watts, preferably in a range of from 5 watts to 20 watts. The speed of the YAG solid-state laser, in particular the travel speed of the laser source of the YAG solid-state laser, preferably lies in a range of from 50 mm/s to 3,000 mm/s. It is also possible that the wavelength, in particular the peak wavelength, of the laser, preferably set up as a YAG solid-state laser, is preferably 1,064 nm, in particular at a frequency of 150 KHz.

Lift-off is in particular a method in which a soluble layer is printed, preferably is printed onto the carrier ply. A decorative layer that is to be dissolved in areas is then preferably printed onto the soluble layer, preferably onto the carrier ply with the soluble layer. Then, the soluble layer with the decorative layer that is to be dissolved in areas lying over it is preferably dissolved, for example by allowing solvents in which the soluble layer can preferably dissolve to act. These can be for example organic solvents and/or water. In particular, the one or more transparent areas are generated by preferably detaching the soluble layer from the carrier ply in the one or more transparent areas with the decorative layer that is to be dissolved. Further, it is conceivable that the one or more transparent areas are generated by means of punching or milling.

It is possible that the first decorative ply and/or the first decoration is opaque or semi-transparent at least in areas or opaque or semi-transparent over the whole surface, in particular in the display area, preferably outside the one or more transparent areas. In particular, the first decorative ply and/or the decorative film has a layer that is opaque at least in areas or preferably several layers which form a multi-layered ply that is opaque at least in areas.

The first decorative ply and/or the first decoration, preferably at least in the display area, preferably provides a first motif or a first partial area of a first motif, wherein the first motif is a static motif. By means of the first decorative ply and/or the first decoration, the first motif or a first partial area of the first motif can thus preferably be put in a state that is visible to the human eye without the aid of optical equipment. The first motif is in particular discernible for the human eye in reflected light, preferably in the case of an observation onto the decorative film, the decorative film body and/or the display body, in particular from a side of the first decorative ply starting from the carrier ply or the dynamically actuatable display. The decorative film and/or the decorative film body preferably is not or is only slightly shone through, preferably is not illuminated and/or shone through more strongly from a side opposite the observation side than with a luminous density of 30 cd/m$^2$. The luminous density of the incident light onto the decorative film and/or the decorative film body from the observation side is preferably not more than 10,000 cd/m$^2$.

In particular, outside the display area the first decorative ply and/or the first decoration has a static motif, and/or provides this, which preferably surrounds and/or delimits the display area, for example in the form of a border, preferably in a color that contrasts with the decoration, in particular with the first decoration and/or with the first motif, inside the display area, and/or in the form of a metallization, for example of chrome. It is also possible that the first decoration and/or the static motif of the first decorative ply and/or of the first decoration outside the display area preferably matches the first decoration inside the display area and/or continues it seamlessly and/or transition-free, preferably with the result that the display area as such is not readily discernible, in particular is not readily discernible on the basis of the first decoration.

Further, it is possible that the first decorative ply and/or the first decoration is transparent or semi-transparent at least in areas outside the display area and/or is backlit and/or shone through outside the display area, in particular wherein this backlighting and/or shining through can preferably be effected not with the dynamically actuatable display, but with further light-emitting elements.

It is possible for example that the static motif is preferably visible outside the display area in particular in the display body, preferably in the case where the dynamically actuatable display is switched on and/or in the case where the dynamically actuatable display is switched off.

The dynamically actuatable display preferably has been or is arranged on a side of the decorative film which, in particular starting from a contact surface between the carrier ply and the first decorative ply, is arranged facing towards or facing away from the first decorative ply.

The dynamically actuatable display can in particular be put in a switched-off state and a switched-on state. During the joining of the decorative film or the decorative film body to the dynamically actuatable display, the dynamically actuatable display is preferably joined to the carrier ply of the decorative film, the first decorative ply and/or the further decorative ply. The dynamically actuatable display, in particular after the joining, in the switched-on state preferably emits light in the direction of the one or more transparent areas of the first decorative ply.

It is possible that, in the case of an observation of the display body from the side of the decorative film, the display area in the switched-off state of the dynamically actuatable display forms the first motif, which is in particular discernible for the human eye and which is preferably a static motif. The dynamically actuatable display is preferably optically hidden, thus preferably is not discernible or is difficult to discern for the human eye. In particular in the case of an observation of the display area of the decorative film, the decorative film body and/or the display body in the switched-off state of the dynamically actuatable display, preferably no further technical function besides the optical perception of the first decoration, for example in the form of a material, such as preferably wood, stone and/or metal, thus preferably becomes visible or is suspected.

Further, it is possible that, in the case of an observation of the display body from the side of the decorative film, the display area in the switched-on state of the dynamically actuatable display has a second motif, which is in particular discernible for the human eye. The second motif is in particular dynamically alterable and/or is a dynamic motif. The first motif is advantageously optically hidden, thus preferably is not discernible or is difficult to discern for the human eye. A dynamically alterable motif is in particular capable of having dynamic motifs and/or is a motif which has static and/or dynamic motifs, preferably simultaneously and/or with a time lag. A particular optical effect is preferably herewith achieved, which arises in particular through a "clash of materials", preferably through the change from a static motif to a dynamic motif at least in areas. For example, a preferably inactive surface with a static, dead wood, metal or stone look suddenly becomes active, dynamic and "living". It is thus possible that the display area previously perceived as a material, such as for example wood, stone and/or metal, in the switched-off state of the display acts as a communicative and/or interactive surface, wherein an item of information and/or a message is preferably shown in the display area.

The dynamically actuatable display is preferably optically hidden in the switched-on state and/or in the switched-off state, in particular wherein only the second motif is visible in the display area in the switched-on state of the dynamically actuatable display and/or the second motif is not visible and/or is not generated in the switched-off state of the dynamically actuatable display.

It is also conceivable that in the switched-on state of the dynamically actuatable display the display area has the first motif and/or a partial area of the first motif in a first area and has the second motif and/or a partial area of the second motif in a second area, wherein the first and the second area preferably do not overlap.

It is preferably also conceivable that the second motif in particular does not have a static motif and/or that, in particular in the switched-on state of the dynamically actuatable display, the display body preferably does not form or generate a static motif, in particular by optically hiding the first motif with the second motif, wherein the second motif preferably has exclusively one or more dynamic motifs.

The observation distance, preferably at which the second motif is discernible, preferably is particularly easily discernible, and/or the second motif optically hides the first motif, is preferably greater than 2.8 m. Further, it is possible that the dynamically actuatable display is optically hidden at a distance greater than 2.8 m. The dimensions of the one or more transparent areas for example preferably lie below the resolving power of the human eye, in particular at a distance of at least 2.8 m.

The observation angle in the case of an observation of the display body from the side of the decorative film, at which the second motif is particularly easily discernible and/or the second motif hides the first motif for the human eye, in particular lies in a range of from −80° to 80°, further preferably in a range of from −70° to 70°, preferably wherein the observation angle in the case of an observation perpendicular to the decorative film and/or the display body has an angle of 0°. In particular in the case of such an observation, the second motif is particularly easily discernible and/or the first motif is optically hidden, in particular optically hidden by the second motif, and/or the dynamically actuatable display is optically hidden in the switched-off state. The decorative film and/or the display body herewith have advantageous properties in particular in fields of application with a substantial proportion of such observation properties.

It is possible that the further decorative ply has a second decoration, wherein the second decoration provides a static motif or a second partial area of the first motif, preferably at least in the display area. The further decorative ply preferably forms a side of the display body facing towards an observer when the display body is in use and/or a front side of the display body. By means of the second decoration, a static motif or a second partial area of the first motif can thus preferably be put in a visible state. It is thus preferably possible that the second decoration with the first decoration provides the first motif or a third partial area of a static motif, in particular of the first motif. In particular, the one or more transparent areas, preferably with the dynamically actuatable display in the switched-off state, with the third partial area form a static motif. The first and/or further decorative plies, in particular in each case or together, provide the first motif or a further partial area of the first motif.

Further, it is possible that the further decorative ply has a further carrier ply which preferably has been or is arranged on the side of the further decorative ply facing away from the first decorative ply. It is herewith possible for example that the further carrier ply takes on a protective function, in particular during transport of the decorative film body and/or the display body. It is possible here that the further decorative ply has one or more further layers, in particular in the form of decorative layers, wherein the further carrier ply is preferably detachable from the one or more further layers of the further decorative ply. It is expedient that the further decorative ply has a detachment layer between the further carrier ply and the one or more layers of the further decorative ply.

Further, it is possible that the further decorative ply is formed similar to the first decorative ply. It is thus possible that the decorative film body is a multi-ply film. In particular, the further decorative ply preferably has at least one ply made of a colorless or colored transparent or translucent thermoplastic material, in particular of ABS, ABS/PC, PC/ABS, PC, PP or PMMA. This preferably acts as a carrier ply for the one or more further layers, in particular in the form of one or more decorative layers, of the further decorative ply.

The one or more further layers, in particular in the form of one or more decorative layers, of the further decorative ply preferably comprise at least one protective varnish layer that is high-gloss or matte and/or provided with a tactile structure. The protective varnish layer is preferably colorless or colored translucent or transparent or also has opaque areas. It is also possible that the protective varnish layer has been or is formed different in particular in areas and has high-gloss and matte areas of surface and at the same time areas of surface with a tactile structure or only has two different ones of the above-named areas of surface. Thus, it is possible for example that an outer edge area of the protective varnish layer has been or is formed different from an area surrounded by the edge area. For example, it is possible that the outer edge area of the protective varnish layer has been or is formed matte and/or tactile and preferably the area surrounded by the edge area has been or is in particular formed high-gloss.

In particular, the further decorative ply is semi-transparent at least in areas or over the whole surface and/or has a transparence in the wavelength range visible to the human eye in a range of from 5% to 100%, in particular in a range of from 20% to 80%, at least in areas or over the whole surface. Further, it is possible that the further decorative ply and/or the decorative film body, in particular in the case of an observation from the side of the further decorative ply, has a reflectance in a range of from 1% to 99% in the display area and outside the one or more transparent areas and/or in a range of from 1% to 99% in the one or more transparent areas. By means of such a transparence and/or reflectance, it is preferably possible that the further decorative ply, in particular besides the protective function, also contributes to the fact that the dynamically actuatable display and/or the first motif or at least one partial area, in particular the first partial area, of the first motif can be optically hidden in the switched-off state of the dynamically actuatable display. Preferably in a combination with the arrangement of the transparent areas, and/or a preferably bright dynamically actuatable display, the further advantage arises in particular that an observer would not expect a display behind the decorative film, but the second motif is surprisingly easily discernible in the switched-on state of the dynamically actuatable display. The further decorative ply preferably moreover guarantees that more sensitive materials, the durability and/or possible use of which is improved, can be used for the carrier ply, the first decorative ply and the dynamically actuatable display.

Further, it has proved to be advantageous that the decorative film and/or the first decorative ply has a transparence in the wavelength range visible to the human eye in a range of from 10% to 75%, in particular in a range of from 35% to 65%, in the display area and outside the one or more transparent areas and/or has a transparence in the wavelength range visible to the human eye in a range of from 10% to 75%, in particular in a range of from 35% to 65%, inside the one or more transparent areas.

It is further possible that the first decorative ply and/or the decorative film in the one or more transparent areas has a transparence in the wavelength range visible to the human eye which differs from the transparence in the wavelength range visible to the human eye in the display area outside the one or more transparent areas by at least 5%, preferably at least 10% to 75%. In particular, the first decorative ply and/or the decorative film, before the generation of the one or more transparent areas, preferably in the areas with the one or more transparent areas to be generated, has a transparence in the wavelength range visible to the human eye of less than 50%, preferably of less than 20%, preferably of less than 5%. Further, it is possible that the first decorative ply and/or the decorative film, after the generation of the one or more transparent areas, in the one or more transparent areas, has a transparence in the wavelength range visible to the human eye of more than 50%, in particular of more than 75%.

Further, it is preferably possible that the decorative film and/or the first decorative ply has a reflectance in the range of from 5% to 90% in the display area and outside the one or more transparent areas and/or has a reflectance in the range of from 20% to 80% inside the one or more transparent areas.

Further, it is conceivable that the decorative film and/or the first decorative ply has a ratio of the transparence in the wavelength range visible to the human eye in the display area outside the one or more transparent areas to the transparence in the wavelength range visible to the human eye of the one or more transparent areas in a range of from 5% to 90%. It is also conceivable that the decorative film, in particular in the case of an observation onto a side of the decorative film facing away from the carrier ply, and/or the first decorative ply has a ratio of the reflectance in the display area outside the one or more transparent areas to the reflectance of the one or more transparent areas in a range of from 20% to 80%.

It is also possible that, in the switched-off state of the dynamically actuatable display in the case of an observation of the display body from the side of the decorative film, the ratio of the reflectance in the display area outside the one or more transparent areas to the reflectance in the one or more transparent areas lies in a range of from 5% to 90%, in particular in a range of from 40% to 70%.

Further, it is possible that, in the switched-off state of the dynamically actuatable display in the case of an observation of the display body from the side of the decorative film, the display body has a reflectance in the range of from 5% to 90% in the display area and outside the one or more transparent areas and/or has a reflectance in the range of from 20% to 80% inside the one or more transparent areas.

Such reflectances and transmittances in particular contribute to the fact that the dynamically actuatable display is particularly difficult to discern in the switched-off state and the second motif is particularly easily discernible and preferably the first motif is particularly well hidden optically in the switched-on state of the display. Further, it is made possible in particular that the dynamically actuatable display is better hidden optically.

The first decorative ply preferably has colors with wavelengths in the range of from 380 nm to 550 nm and/or has colors and/or optical effects which are selected individually or in combination from: natural wood tones, metallic silver tones, tones from gold via red gold to copper colors, in particular matte to high-gloss, preferably with and/or without brushing. The further decorative ply in particular has colors with wavelengths in the range of from 380 nm to 550 nm and/or colors and/or optical effects which are selected individually or in combination from: natural wood tones, metallic silver tones, tones from gold via red gold to copper colors.

Such combinations of colors and/or optical effects preferably improve the possibility of optically hiding the first motif and/or in particular of representing the second motif with an improved quality.

It is possible that, by means of the one or more transparent areas, the first decorative ply forms a preferably uniform and in particular homogeneous shadow mask. It has in particular proved to be advantageous that the one or more transparent areas, in particular in the case of an observation in a top view onto the decorative film and/or onto the first decorative ply, are arranged in a grid. By a grid is meant in particular a regular one-dimensional or two-dimensional pattern. For example, for this purpose, the first decorative ply comprises a preferably structured metallic layer and/or a partial decorative layer with holes and/or a perforation.

It is in particular advantageous that the grid of the one or more transparent areas has a grid width in a range of from 1 mm to 5 mm. Further, it is expedient that the one or more transparent areas, in particular in a top view onto the first decorative ply, in each case form a circular surface and/or have a diameter in the range of from 0.25 mm to 0.75 mm. It is further conceivable that the transparent areas have a shape or a combination of different shapes, for example selected from: circle, ellipse, triangle, quadrangle, polygon, irregular polygon, diamond, cross. In particular, the one or more transparent areas, in particular in a top view onto the first decorative ply, in each case have a surface area in a range of from 0.04 $mm^2$ to 0.5 $mm^2$, preferably in a range of from 0.04908 $mm^2$ to 0.44179 $mm^2$. The one or more transparent areas preferably cover a proportion in a range of from 0.5% to 3% of the total surface area of the display area. It is possible that the display area has a surface area in a range of from 0.1 $m^2$ to 1.0 $m^2$.

Further, it has proved to be advantageous that the one or more transparent areas are arranged in rows arranged parallel to each other. Transparent areas arranged in every second row are preferably arranged offset by half of the grid width relative to transparent areas of the respectively neighboring rows in the direction of the row.

Thus, in a grid with transparent areas in several parallel horizontal rows arranged vertically one below another, preferably each transparent area of a second row counted in the vertical direction is preferably arranged offset in the horizontal direction by half of the horizontal distance between two directly neighboring transparent areas. In particular, the vertical distance between two directly neighboring rows here is exactly as large as the horizontal distance between two directly neighboring transparent areas.

The dynamically actuatable display advantageously has a luminous density of at least 300 $cd/m^2$, in particular at least 500 $cd/m^2$. The abbreviation "cd" preferably stands for candela. Details with respect to the brightness and/or luminous density are preferably also given in nits. Here, in particular, 1,000 nits=1,000 $cd/m^2$.

Further, it is expedient that the dynamically actuatable display has a contrast ratio of at least 2,000:1 and/or in a range of from 2,000:1 to 10,000:1. Further, it is hereby possible in particular to adapt the light emitted by the dynamically actuatable display for example with contrasting effects to the first decoration and/or second decoration such that the first motif is particularly well hidden optically.

In particular, the second motif is particularly easily discernible in the switched-on state of the dynamically actuatable display, when the ambient light is preferably low, for example at night. In particular in the case of low ambient light, for example at night, a minimum luminous density of the dynamically actuatable display which is preferably necessary below the minimum luminous density in the case of stronger ambient light, in particular in the daytime, is preferably necessary. It is thus possible that in the switched-on state of the dynamically actuatable display the dynamically actuatable display preferably has a minimum luminous density of 300 $cd/m^2$ in the case of low ambient light, in particular at night, and/or in the case of an illuminance of less than 1 lx or in the range of from 0.00013 lx to 1 lx. It is further possible that in the switched-on state of the dynamically actuatable display the dynamically actuatable display preferably has a minimum luminous density of 400 cd/m² in the case of stronger ambient light, in particular in the daytime, and/or in the case of an illuminance of more than 1 lx or in the range of from 1 lx to 130,000 lx.

Further, it is possible that the dynamically actuatable display has light-emitting elements. Further, it is possible that the light-emitting elements are arranged in a grid, in particular with a grid width in a range of from 0.5 mm to 10 mm, preferably in the range of from 1 mm to 10 mm. In particular, the light-emitting elements are arranged partially or completely overlapping the one or more transparent areas and/or in the one or more transparent areas. Further, it is possible that the distance, preferably measured from center to center, between two directly neighboring light-emitting elements is a whole-number multiple of the grid width of the one or more transparent areas or the grid width of the one or more transparent areas is a whole-number multiple of the distance between two directly neighboring light-emitting elements.

It is further conceivable that the dynamically actuatable display has a light matrix, preferably consisting of light-emitting elements, in particular with light-emitting elements in the form of mini-LEDs and/or micro-LEDs. It is also possible that the dynamically actuatable display has light-emitting elements in the form of pixels. The light-emitting elements preferably have a width in the range of from 1.5 mm to 3 mm and/or a length in the range of from 1.5 mm to 3 mm. The light-emitting elements preferably have in each case a surface area in the range of from 2.25 mm² to 9 mm².

It is possible that the light matrix with a plurality of light-emitting elements has an external shape, in particular in the form of a rectangular shape, as a freeform or in the form of a circle, an ellipse, a triangle or a polygon. The external shape is in particular an outline shape around the outer light-emitting elements of the light matrix. It is additionally or alternatively possible that the external shape of the light matrix has been or is covered by means of an additional opaque mask layer with transparent cutout such that as a result the light matrix preferably has the appearance of the external shape of the transparent cutout. For example, it is conceivable that a rectangular light matrix is or has been covered with a mask with triangular transparent cutout, such that as a result the light matrix has a triangular appearance. In other words, the additional opaque mask layer has been or is arranged in particular in an area which comprises the external shape of the light matrix, preferably wherein the additional opaque mask layer is opaque in this area and is transparent within an area enclosed by this area.

It is also possible that the dynamically actuatable display is an OLED display and in particular that the layers forming the OLED are arranged on a flexible substrate. It is thereby possible that the display is deformable and/or has been or is deformed three-dimensionally or two-and-a-half-dimensionally.

The dynamically actuatable display has in particular a density of the light-emitting elements in the range of from 4,000 light-emitting elements per m² to 12,000 light-emitting elements per m². In particular, a pixel period and/or a pitch of the dynamically actuatable display in a range of from 1.5 mm to 3 mm is conceivable. The display is preferably a color display. The dynamically actuatable display preferably has a color depth and/or grayscales in the range of from 8 bits to 48 bits. The refresh rate of the dynamically actuatable display preferably lies in a range of from 25 Hz to 200 Hz, preferably in a range of from 40 Hz to 100 Hz.

It is possible that the dynamically actuatable display has at least one display element, preferably with a length and/or width in the range of from 100 mm to 1,500 mm. Further, it is possible that the at least one display element has a depth in the range of from 5 mm to 55 mm. The resolution of the dynamically actuatable display and/or the at least one display element is preferably at least 24 px×24 px or lies in a range of from 12×12 px to 350×350 px (px=pixels). Further, it is conceivable that the dynamically actuatable display comprises several display elements, in particular with the named dimensions. The at least one display element is in particular flat or 2D or 2.5D or 3D curved.

Such display properties in particular improve the quality of the second motif as well as its visibility in the switched-on state of the dynamically actuatable display and/or contribute to the fact that the first decoration and/or the first motif is particularly well hidden in the switched-on state of the display.

The dynamically actuatable display preferably has a distance from the first decorative ply and/or the carrier ply in a range of from 3 mm to 30 mm, preferably in a range of from 5 mm to 15 mm, wherein the distance is preferably a maximum distance.

The switched-off state and the switched-on state of the dynamically actuatable display is preferably activatable and deactivatable in particular by means of an electronic control component and/or the dynamically actuatable display is in particular dynamically actuatable preferably by means of an electronic control component.

In particular, the control component has a storage medium. The actuation of the dynamically actuatable display to generate a dynamic motif, in particular the second motif, is preferably defined in the storage medium, in particular by means of a digital data set, preferably in a digital video format. The flexibility of the possible motifs is in particular increased hereby. The digital video format is present for example in the MPEG, MOV, AVI, WMV, FLV, MKV format.

The second motif, in particular the video, the animation and/or the movie, is preferably optimized on the decorative film and/or the decorative film body. It is possible in particular that the digital data set takes account of and/or comprises decoration data about the decorative film and/or the decorative film body which are used in particular to actuate the dynamically actuatable display. The decoration data comprise and/or take account of for example values of the transparence and/or the color in various areas of the decorative film and/or the decorative film body. It is possible here that the decoration data and/or the various areas are allocated to light-emitting elements, whereby in particular the luminous density and/or color of the light-emitting elements to be generated, in particular for generating the second motif, is adapted corresponding to the respective decoration data.

It is also possible that the control component comprises at least one sensor, in particular at least one brightness sensor, proximity sensor and/or touch sensor. It is possible for example that, by means of the at least one sensor, a signal is generated and processed such that the control component switches the dynamically actuatable display on and in particular actuates the dynamically actuatable display by means of the digital data set on the storage medium such that the second motif, preferably in the form of a dynamic motif, is generated and/or the dynamically actuatable display is switched off. Such a sensor preferably makes an interaction with a user or observer possible, for example it is possible that a radar function preferably triggers an interaction.

Further, it is possible, in particular in the case where the control component has a touch sensor, that the first decoration, the first motif and/or the second motif have or include one or more patterns, preferably symbols, which preferably indicate corresponding touch functions. In particular, it is possible in the second motif to provide a symbol which indicate the stopping and continuation of the second motif or other control possibilities and preferably make them possible by means of a touch function.

In particular, the touch sensor has been or is arranged completely or only partially overlapping the dynamically actuatable display or alternatively arranged not overlapping the dynamically actuatable display, thus preferably arranged neighboring the dynamically actuatable display. Further, it is possible that, neighboring the dynamically actuatable display, a control area is provided in which touch functions are present which can serve in particular to control the dynamically actuatable display and/or to control other functions, for example in the case where the touch sensor is preferably arranged neighboring the dynamically actuatable display.

It is further conceivable that the dynamically actuatable display is put in the switched-on state or the switched-off state when an article exceeds or falls short of a particular distance from the display body and/or when a brightness value is exceeded or fallen short of. It is also conceivable that the display body shows the first motif or the second motif when an article exceeds or falls short of a particular distance from the display body and/or when a brightness value is exceeded or fallen short of. It is thus possible in particular that the display body preferably fulfills an interactive and/or communicative function in addition to a decorative function and in particular a protective function.

The carrier ply of the decorative film is expediently transparent. The carrier ply preferably comprises a preferably thermoplastic material or a combination of preferably thermoplastic materials selected from: ABS, ABS/PC, PC/ABS, PC, PP or PMMA. The carrier ply preferably has a layer thickness in the range of from 0.5 mm to 30 mm, in particular in the range of from 0.5 mm to 0.75 mm. The first decorative ply 3 preferably has a layer thickness in a range of from 0.5 µm to 10 µm. The further decorative ply 8 preferably has a layer thickness in the range of from 0.5 µm to 30 µm.

A decorative ply, in particular the first and/or further decorative ply, and/or the carrier ply is preferably single- or multi-layered.

The first decorative ply, in particular for producing the first decoration, is preferably produced at least partially using a printing process, in particular using a gravure printing process and/or screen printing process and/or inkjet printing process. It is preferably possible that the first decorative ply is stamped and/or printed onto the carrier ply. It is in particular also possible that the carrier ply is printed directly with one or more printed layers or is provided with one or more further decorative layers of the first and/or further decorative ply.

In particular, it is possible that the first decorative ply, preferably for producing the first decoration, and/or the second decorative ply, in particular for producing the second decoration, preferably in each case over part of the surface and/or over the whole surface, comprises one or more decorative layers and/or a combination of the following decorative layers:

One or more color layers. The one or more color layers are in particular one or more varnish layers. These varnish layers preferably contain dyes and/or pigments, in particular colored pigments, optically variable pigments, thermochromic pigments, luminescent dyes and/or pigments, magnetic pigments and/or electrically conductive pigments. The varnish layers here are preferably formed opaque, semi-transparent and/or transparent.

The one or more varnish layers are in particular one or more printed layers and/or are preferably applied by means of printing, in particular by means of gravure printing, relief printing, screen printing, flexographic printing and/or by means of digital printing methods. It is also possible that the application is effected by means of further coating techniques, such as for example slot casting and/or spraying. In particular, the one or more varnish layers are applied partially and/or over the whole surface.

One or more layers containing a liquid-crystal material. These liquid-crystal materials are preferably aligned on a respective orientation layer. It is also possible here that the liquid-crystal material of the respective layer has areas in which the liquid-crystal material is oriented differently and thus has different optical properties. For example, a different polarization and/or a different optically variable color-change effect. In particular, a cholesteric or nematic liquid-crystal material is used as liquid-crystal material.

One or more layers containing a thin-film system for generating color-shift effects dependent on the angle of view. Such a thin-film system is characterized in particular in that this thin-film system has one or more spacer layers which meet the $\lambda/4$ or $\lambda/2$ condition in particular for a wavelength A in the visible wavelength range. The incident light is reflected/refracted at the boundary surfaces of this spacer layer, whereby a corresponding color-change effect is generated by interference. Such a thin-film system preferably has an absorber layer, in particular a semi-transparent absorber layer, preferably made of a metallic material, a dielectric spacer layer and preferably a reflective layer, in particular an opaque or semi-transparent metallic layer. A thin-film layer system can furthermore preferably also be formed of a sequence of high- and low-refractive-index dielectric layers, of which one or more, preferably two or more, meet the above-mentioned $\lambda/4$ or $\lambda/2$ condition. High-refractive-index layers are in particular layers with a refractive index of more than 1.5. Low-refractive-index layers are in particular layers with a refractive index of less than 1.5.

One or more metallic layers. The one or more metallic layers preferably have two or more layers made of different metals. For this purpose, metals or metal alloys which have a different optical appearance for the human observer, for example made of Al, Cu, Au, Ag, Cr, In and/or Sn, are preferably used. The metallic layers can here be formed opaque, semi-transparent and/or transparent. It is conceivable that a metallic layer is for example brushed or high-gloss.

One or more volume hologram layers. A volume hologram layer here preferably consists of a photosensitive material which is exposed to light in a holographic exposure process with an interference pattern, in which at least one object beam and at least one reference beam are superimposed.

A master which has a microstructured, in particular a diffractive and/or refractive, surface relief is preferably used as hologram master here. The volume hologram inscribed in the volume hologram layer can here be a reflection hologram or a transmission hologram. Further, it is possible that the volume hologram layer is still after treated after exposure of the volume hologram. For example, it is possible that the distance between the Bragg planes of the volume hologram is altered in partial areas or over the whole surface by such an aftertreatment, for example the application of corresponding substances or by radiation, and thus that the color of the volume hologram is altered correspondingly over the whole surface or over part of the surface.

One or more layers having an optically active surface structure or an optically active surface relief. These layers preferably consist of a replication layer, in particular a layer of a thermoplastic and/or UV-curable varnish. The respective surface structure is preferably introduced into this layer by means of a stamping tool, in particular by means of thermal replication and/or UV replication.

The surface structure or the surface relief is preferably a diffractive surface structure. Such a surface structure can have the following elements individually or in combination: computer-generated hologram, first- or higher-order diffraction structure, in particular consisting of sinusoidal or blazed-type diffractive gratings or Fresnel-type microstructures, and/or zero-order diffraction structure.

The surface structure can be a holographic surface structure, which is formed in particular of a surface relief produced in a holographic process.

The surface structure is preferably a matte structure, in particular an anisotropic or isotropic matte structure. Such matte structures can here have areas in which the structure parameters of the matte structure differ from each other and which thus scatter the light differently, for example scatter in different preferred directions or scatter at a different scattering angle.

The surface structure is preferably a macrostructure. Such macrostructures preferably have substantially refractively acting structure elements. These macrostructures preferably show a microlens structure, a microprism structure and/or a micromirror structure, the respective structure elements of which are formed of lenses, substantially refractively acting prisms and/or micromirrors.

One or more reflective layers. These reflective layers are formed in particular of metallic layers which are transparent, semi-transparent and/or opaque. However, it is also possible that the reflective layers are formed of dielectric reflective layers. For this purpose, layers made of a transparent low- or high-refractive-index material, such as for example ZnS or $TiO_2$, are preferably used.

In particular, it is possible that the above-listed layers are arranged as a pattern.

Further, it is possible that the decorative film comprises a buffer layer between the first decorative ply and the carrier ply. The buffer layer is in particular transparent over the whole surface and/or is or has been applied to the carrier ply of the decorative film over the whole surface. The buffer layer is preferably applied to the carrier ply of the decorative film over the whole surface. The buffer layer is preferably formed as an adhesive layer and/or comprises an adhesive. The buffer layer in particular minimizes disadvantageous effects of tolerances in the generation of the transparent areas because the buffer layer can be partially removed in the transparent areas, in particular wherein the transparence or other material properties are only minimally or not negatively affected in these areas. The buffer layer thus acts in particular as a protective layer for the carrier ply. For example, it is also possible by means of the buffer layer to use a laser-sensitive carrier ply, as this is not "injured" by a laser. In particular, the buffer layer thus preferably increases the materials that can be used for the decorative film. Further, it is conceivable that a further layer that is applied over the whole surface and/or is transparent over the whole surface, for example comprising PC and/or PMMA, is arranged on the side of the buffer layer facing away from the carrier ply.

The first decorative ply, in particular for forming the first decoration, has one or more first decorative layers, which are preferably selected from the above-named decorative layers.

At least one first decorative layer of the one or more first decorative layers is preferably a color layer, in particular in the form of a background color layer, which in particular comprises a varnish layer. It is conceivable that the one or more first decorative layers comprise only the at least one first decorative layer.

Further, it is possible that at least one second decorative layer of the one or more first decorative layers is an opaque color layer and/or a metallic layer. The at least one second decorative layer of the one or more first decorative layers is preferably arranged on the side of the at least one first decorative layer of the one or more first decorative layers facing away from the carrier ply. The at least one second decorative layer of the one or more first decorative layers preferably acts as a minimum color application. In particular, one or more further partial and/or patterned decorative layers, preferably varnish layers, are or have been deposited on the background color layer, for example as a wood grain or other pattern.

It is also possible that the one or more first decorative layers comprise one or more of the following layers, in particular in the following sequence starting from the carrier ply:
  one or more printed layers,
  one or more varnish layers, preferably colored varnish layers, in particular comprising the at least one first decorative layer of the one or more first decorative layers.

Further, it is possible that the one or more first decorative layers comprise one or more of the following layers, in particular in the following sequence starting from the carrier ply:
  one or more metallic layers, which are preferably applied by means of vapor deposition,
  one or more varnish layers, which are preferably vapor-depositable.

Further, it is possible that the first decorative ply comprises one or more further decorative layers on the side of the one or more first decorative layers facing away from the carrier ply.

The first decorative ply preferably has a protective layer on its outer side facing away from the carrier ply. In particular, the first decorative ply has an adhesive layer on its outer side facing towards the carrier ply. An adhesive layer comprises in particular one or more of the following materials: acrylates, ABS, PVC.

Alternatively or additionally, it is also possible in particular that the decorative film has a further protective layer on a side of the carrier ply opposite the first decorative ply. It is conceivable here that the protective layer, in particular as a transparent protective layer, has been or is applied to the carrier ply on the side of the carrier ply facing away from the first decorative ply. This protective layer has been or is applied, preferably applied over the whole surface, for example by means of flooding, in particular PU flooding, wet varnishing and/or film application. PU is in particular polyurethane.

It is further possible that at least one metallic layer is applied at least in areas in the form of an island layer, preferably by means of vapor deposition, wherein the metallic layer preferably comprises indium. It has been shown in particular that during the vapor deposition indium forms an island layer and the metallic layer is thereby preferably permeable to radiation, in particular to radar radiation, Bluetooth, WLAN, UKW, DAB, DAB+, DVB-T, DVB-T2 and/or radiation of other wavelengths. For example, possible uses of sensors as well as the reliable reachability thereof are hereby increased. This is advantageous for example in the case of the use of a display body in vehicles, as in particular the prerequisites for autonomous driving are improved. It is expedient that the at least one metallic layer is semi-transparent and/or opaque at least in areas and/or over the whole surface.

The one or more transparent areas are preferably only introduced in the display area, in which the dynamically actuatable display has also been arranged or is also attached. In particular, no openings, cuts, gaps and/or holes are preferably thus present in the at least one metallic layer outside the display area. At least one sensor is preferably arranged neighboring the display area, and in particular not in the display area, and uses an island layer as at least one metallic layer, whereby in particular the permeability to radiation outside the display area is guaranteed and thus the reachability of the sensor is improved.

Further, it is possible that the first decorative ply is joined to the carrier ply in an injection-molding process, in particular wherein the first decorative ply is provided by means of a transfer film, preferably an IMD transfer film. Further, it is conceivable that a spacer body is injected between the first decorative ply and the further decorative ply by means of an injection-molding material and/or the first decorative ply is back-injection molded by an injection-molding material together with the further decorative ply, in particular wherein the first decorative ply and the further decorative ply join together.

Further, it is possible that the further decorative ply has been or is applied to the first decorative ply over the whole surface and/or covers the first decorative ply and/or covers the one or more transparent areas.

In particular, a spacer body is arranged between the further decorative ply and the first decorative ply and/or the carrier ply. The spacer body preferably has a thickness in the range of from 1 mm to 20 mm, preferably in a range of from 4 mm to 20 mm. In particular, the spacer body preferably has a transparence in the range of from 15% to 80%. Further, it is possible that the spacer body comprises or consists of an injection-molding material. It is thus possible that the decorative film body is a plastic body with the first and/or the further decorative ply. It is also conceivable that the first decorative ply, the further decorative ply, the dynamically actuatable display and/or the carrier ply are or have been joined in an injection-molding process.

For producing the decorative film body, a method with the following steps is in particular conceivable, in particular in the specified sequence:
 providing the decorative film with the first decorative ply,
 generating the one or more transparent areas in the decorative film and/or the first decorative ply,
 providing a further decorative film with the further decorative ply;
 placing the first decorative ply and the further decorative ply in an injection mold with a first and a second mold half, which together form a cavity for molding the decorative film body, wherein the decorative film is attached to a first wall of the cavity and the further decorative film is attached to a second wall of the cavity opposite the first wall;
 back-injection molding the decorative film and the further decorative film with an injection-molding material, with the result that the decorative film forms a first surface and the further decorative film forms a second surface of the decorative film body opposite the first surface.

In a further step, the dynamically actuatable display is preferably joined to the decorative film body. It is also conceivable that the dynamically actuatable display represents the second wall at least in areas and is joined to the decorative film body, in particular to the second surface of the decorative film body, during the back-injection molding.

Further, it is possible that the first and/or further decorative ply is preferably deep drawn before being placed in the injection mold. So-called inserts can thereby be generated which, before the back-injection molding, can in particular be three-dimensionally deformed comparatively strongly, such as is often not possible during the back-injection molding.

Here, for example, usual deep-drawing methods are used. It is possible that the first and/or further decorative ply is provided in the form of sheets and is placed in a deep-drawing die which has the desired final contour. Through the application of heat, preferably with a temperature of from 80° C. to 200° C., the first and/or further decorative ply is preferably made deformable. In particular, the first and/or further decorative ply is then adapted to the shape of the deep-drawing die by application of vacuum and/or by application of a form punch and/or positive air pressure and is thus preferably brought to the desired final contour. During cooling, the material of the first and/or second decorative ply then preferably cures again, with the result that it preferably retains the final contour.

To form the tactile structure during the back-injection molding, an in particular tactile surface relief is preferably molded into the surface of the further decorative ply facing away from the injection-molding material, in particular on the basis of a pattern layer which is arranged between the wall of the cavity and a carrier film, the further carrier ply or the further decorative ply.

The tactile structure thus preferably forms during the injection molding if the further decorative ply is plastically deformable due to the heat and pressure of the injected injection-molding material. The pattern layer has been or is formed preferably directly by the wall of the cavity or provided preferably by a separate inlay, in particular by the carrier film, the further decorative ply and/or further carrier ply of the further decorative ply itself.

It is in particular also possible that the dynamically actuatable display has been or is fastened to the first decorative ply by means of mechanical fastening, for example by means of clips and/or screws and/or by means of back-injection molding and/or insert molding. Further, it is conceivable that the dynamically actuatable display 7 is fastened to the carrier ply 2 by means of mechanical fastening, for example by means of clips and/or screws and/or by means of back-injection molding and/or insert molding.

BRIEF DESCRIPTION OF THE DRAWINGS

In the following, the invention is explained by way of example with reference to several embodiment examples utilizing the attached drawings. There are shown in:
 FIGS. 1a to 1d method for producing a decorative film,
 FIG. 2 method for producing a display body,
 FIG. 3 a decorative film,
 FIGS. 3 to 8 decorative films, FIGS. 9*a* and 9*b* decorative plies,
FIGS. 10*a* to 10*c* decorative film bodies,
FIGS. 11*a*, 11*b*, 12 decorative films,
FIGS. 13*a*, 13*b* and 13*c* display bodies,
FIG. 14*a* a display body, decorative film body or a decorative film,
FIGS. 14*b* and 14*c* display bodies,
FIGS. 15*a* and 15*b* display bodies.

DETAILED DESCRIPTION

Figure 6:
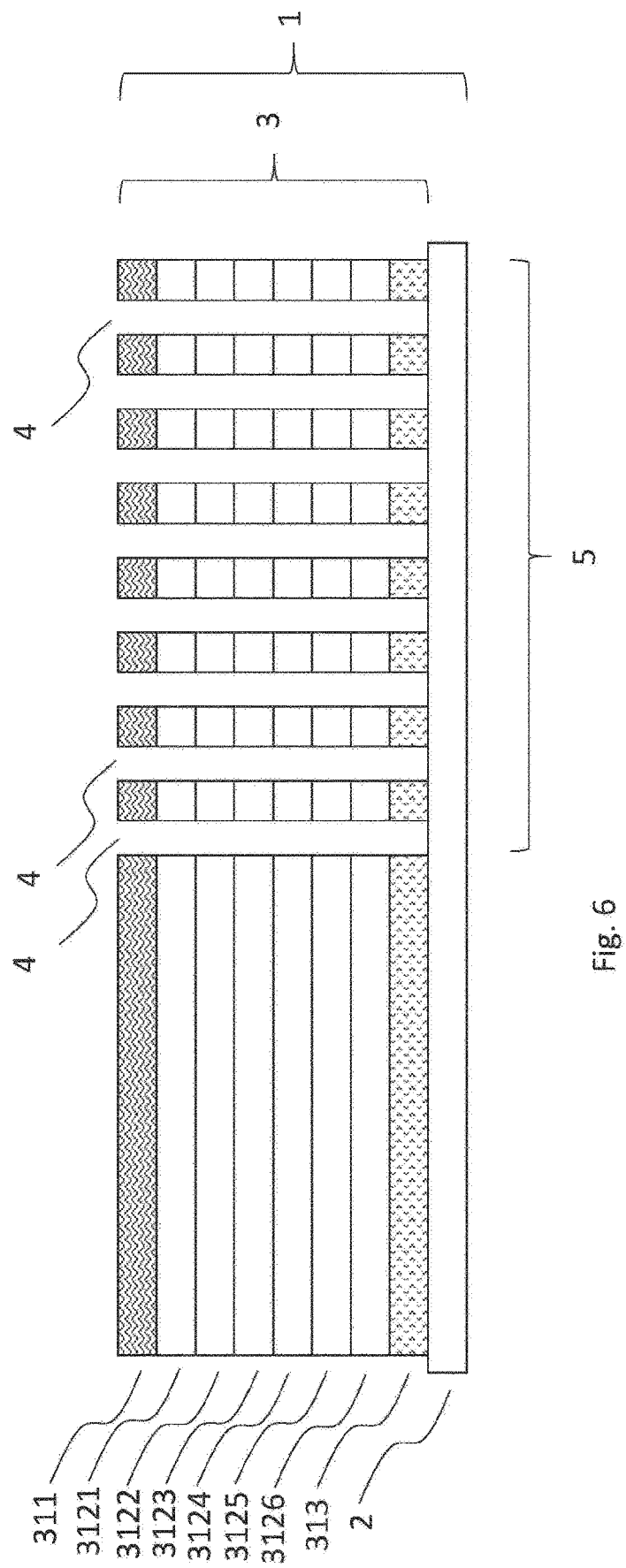

FIG. 1*a* schematically shows a method for producing a decorative film for application to a dynamically actuatable display. Such a method comprises in particular the following steps, preferably in the specified sequence:
providing 91 a carrier ply 2,
applying 92 a first decorative ply 3 to the carrier ply 2, wherein the first decorative ply 3 has a first decoration 8 in a display area 5,
generating 93 one or more transparent areas 4 in the display area 5, wherein in the one or more transparent areas 4 the decorative film 1 is permeable to light emitted by the dynamically actuatable display 7.

FIG. 1*b* schematically shows an example of the provision 91 of a carrier ply 2 and the application 92 of the first decorative ply 3 to the carrier ply 2. For example, it is possible that the first decorative ply 3 is applied to the carrier ply 2 as a laminating film or transfer ply of a transfer film. It is possible here that, for producing the first decorative ply 3, one or more printed layers are printed onto the carrier ply 2 or a carrier ply of a transfer film, in particular wherein the one or more printed layers are then applied to, in particular stamped onto, the carrier ply 2 one after another or together.

The first decorative ply 3, in particular for forming the first decoration 31, is preferably produced using a printing process, preferably using a gravure printing process. It is also conceivable that the first decorative ply 3 is printed onto the carrier ply 2. Further, it is possible that the first decorative ply is or has been produced using a screen printing process and/or inkjet printing process.

It is thus possible in particular that the first decorative ply 3 is stamped and/or printed onto the carrier ply 2. It is thus also conceivable that, before the application to the carrier ply 2, the first decorative ply 3 is preferably present not in the form of layers, but for example at least partially as one or more colorants. With respect to further printing processes and possible embodiment of the printed layers, reference is made in particular to the above statements.

It is further possible that the first decorative ply 3 is joined to the carrier ply 2 in an injection-molding process. Here, the first decorative ply 3 is provided for example by means of a transfer film, preferably an IMD transfer film.

As is shown schematically in particular in FIG. 1*c*, the one or more transparent areas 4 are preferably generated by means of a laser 6, in particular after the application of the first decorative ply 3 to the carrier ply 2.

The one or more transparent areas 4 are preferably openings, apertures, cuts, gaps and/or holes in the first decorative ply 3. The one or more transparent areas 4 preferably are or have been generated by introducing and/or leaving behind openings, apertures, cuts, gaps and/or holes, preferably at least in the first decorative ply 3. The one or more transparent areas 4 preferably penetrate at least one and/or all layers of the first decorative ply 3. The one or more transparent areas 4 preferably are or have been generated by means of a cutting tool, in particular by means of lasers, and/or lift-off, preferably in a regular one- or two-dimensional pattern, preferably hole pattern.

The cutting tool is preferably a laser 6, in particular set up as a $CO^2$ laser or set up as a YAG solid-state laser. The power of the $CO^2$ laser here is for example 8 watts. The power of the $CO^2$ laser expediently lies in a range of from 5 watts to 50 watts, preferably in a range of from 5 watts to 25 watts. The speed of the $CO^2$ laser 6, in particular the travel speed of the laser source, is for example 5 mm/s. It is possible in particular that the speed lies in a range of from 2 mm/s to 100 mm/s, preferably in a range of from 2 mm/s to 50 mm/s. The wavelength, in particular the peak wavelength, of the laser 6, preferably set up as a $CO^2$ laser, is preferably 1,060 nm. The power of the YAG solid-state laser here is for example 8 watts. The power of the YAG solid-state laser expediently lies in a range of from 5 watts to 20 watts. The speed of the YAG solid-state laser 6, in particular the travel speed of the laser source, is for example 350 mm/s. It is possible in particular that the speed lies in a range of from 50 mm/s to 3,000 mm/s. The wavelength, preferably the peak wavelength, of the laser 6, in particular set up as a YAG solid-state laser, is preferably 1,064 nm, in particular at a frequency of 150 KHz.

It is also possible that the one or more transparent areas 4 are generated by means of lift-off. Lift-off is in particular a method in which a soluble layer is printed, preferably is printed onto the carrier ply 2. A decorative layer that is to be dissolved in areas is then preferably printed onto the soluble layer, preferably onto the carrier ply 2 with the soluble layer. Then, the soluble layer with the decorative layer that is to be dissolved in areas lying over it is preferably dissolved, for example by allowing solvents in which the soluble layer can preferably dissolve to act. These can be for example organic solvents and/or water. In particular, the one or more transparent areas 4 are generated by preferably detaching the soluble layer from the carrier ply 2 in the one or more transparent areas 4 with the decorative layer that is to be dissolved.

Further possible methods for generating the one or more transparent areas 4 are for example milling and/or punching.

By the one or more transparent areas 4 of the first decorative ply 3 is meant here in particular one or more areas in which the first decorative ply 3 has been removed. It is also possible that in the one or more transparent areas 4 the opacity of the first decorative ply is or has been reduced, in particular in relation to surrounding areas of the first decorative ply 3, and/or the transparence of the first decorative ply 3 is or has been increased, in particular in relation to surrounding areas of the first decorative ply 3.

It is preferably possible that the first decorative ply 3 and/or the decorative film 1 in the one or more transparent areas 4 has a transparence in the wavelength range visible to the human eye which differs from the transparence in the wavelength range visible to the human eye in the display area 5 outside the one or more transparent areas 4 by at least 5%, preferably at least 10% to 75%.

In particular, the first decorative ply 3 and/or the decorative film 1, before the generation of the one or more transparent areas 4, preferably in the areas 44 with the one or more transparent areas 4 to be generated, has a transparence in the wavelength range visible to the human eye of less than 50%, preferably of less than 20%, preferably of less than 5%. Further, it is possible that the first decorative ply 3 and/or the decorative film 1, after the generation of the one or more transparent areas 4, in the one or more transparent areas 4, has a transparence in the wavelength range visible to the human eye of more than 50%, in particular of more than 75%.

FIG. 1*d* schematically shows a method for producing a decorative film body 10 for application to a dynamically actuatable display 7. The first decorative ply 3 is here preferably joined to the further decorative ply 8, in particular by means of hot stamping, hot lamination, cold stamping, lamination and/or injection molding, in particular in-mold decoration and/or back-injection molding. Further, it is possible that the decorative film 1 is joined to the first decorative ply 3 with the further decorative ply 8.

It is possible for example that a spacer body is injected between the first decorative ply 3 and the further decorative ply 8 by means of an injection-molding material and/or the first decorative ply 3 together with the further decorative ply 8 is back-injection molded by an injection-molding material. In particular, the first decorative ply 3 and the further decorative ply 8 join together during the injection of the injection-molding material and/or during the back-injection molding of the injection-molding material. It is also possible that the dynamically actuatable display 7 here is joined at least to the decorative film 1, in particular the carrier ply 2 and/or the first decorative ply 3.

It is also possible that the further decorative ply 8 is applied to the first decorative ply 3 over the whole surface and/or covers the first decorative ply 3 and/or covers the one or more transparent areas 4. The coverage is preferably over the whole surface here.

FIG. 2 schematically shows a method for producing a display body 20, comprising the following steps:
 providing a decorative film 1 or a decorative film body 20
 joining the decorative film 1 or the decorative film body 20 to a dynamically actuatable display 7, in particular by means of hot stamping, hot lamination, cold stamping, lamination, lining, adhering and/or injection molding, in particular in-mold decoration and/or back-injection molding.

FIG. 3 shows the decorative film 1 for application to a dynamically actuatable display, comprising:
 the carrier ply 2,
 the first decorative ply 3.

In the display area 5 the first decorative ply 3 has a first decoration 31 and one or more transparent areas 4. In the one or more transparent areas 4 the decorative film 1 is permeable to light emitted by the dynamically actuatable display 7.

It is preferably possible here that the first decoration 31 is present for example in areas or over the whole surface in the decorative area 5, preferably outside the one or more transparent areas 4. Further, it is possible in particular that the first decoration 31 is also present in areas or over the whole surface outside the decorative area 5. It is also conceivable that the first decorative ply 3 has the first decoration 31 only in the display area 5.

It is possible here that it the one or more transparent areas 4 are preferably formed by several openings, cuts, holes, gaps and/or areas with increased transparence in the first decorative ply 3. It is further conceivable that the one or more transparent areas 4 are formed by one continuous transparent area or several transparent areas separated from each other.

The display area 5 shown comprises the decorative film 1 in particular in areas. Further, it is conceivable that the display area 5 comprises the entire decorative film 1.

The first decorative ply 3 and/or the first decoration 31 here is preferably opaque or semi-transparent at least in areas or is opaque or semi-transparent over the whole surface. In particular, the first decorative ply 3 and/or the first decoration 31, preferably at least in the display area 5, provides a first motif or a first partial area of a first motif, wherein the first motif is a static motif. By means of the first decorative ply 3 and/or the first decoration, the first motif or a first partial area of the first motif can preferably be put in a state that is visible to the human eye without the aid of optical equipment. The first motif and/or the first partial area of the first motif is in particular arranged in the display area 5 and preferably outside the one or more transparent areas 4. It is also conceivable that the one or more transparent areas 4 also form a partial area of the first motif.

The first decorative ply 3, in particular for forming the first decoration 31, has one or more first decorative layers, which are preferably selected from the above-named decorative layers and are produced corresponding to the above statements.

At least one first decorative layer of the one or more first decorative layers is preferably a color layer, in particular in the form of a background color layer, which in particular comprises a varnish layer. It is conceivable that the one or more first decorative layers comprise only the at least one first decorative layer.

Further, it is possible that at least one second decorative layer of the one or more first decorative layers is an opaque color layer and/or a preferably semi-transparent metallic layer. The at least one second decorative layer of the one or more first decorative layers is preferably arranged on the side of the at least one first decorative layer of the one or more first decorative layers facing away from the carrier ply. The at least one second decorative layer of the one or more first decorative layers preferably acts as a minimum color application. In particular, one or more further partial and/or patterned decorative layers, preferably varnish layers, are or have been deposited on the background color layer, for example as a wood grain or other pattern.

It is also possible that the one or more first decorative layers comprise one or more of the following layers, in particular in the following sequence starting from the carrier ply:
 one or more printed layers,
 one or more colored varnish layers, in particular comprising the at least one first decorative layer of the one or more first decorative layers.

Further, it is possible that the one or more first decorative layers comprise one or more of the following layers, in particular in the following sequence starting from the carrier ply:
 one or more metallic layers, which are preferably applied by means of vapor deposition,
 one or more varnish layers, which are preferably vapor-depositable.

Further, it is possible that the first decorative ply 3 comprises one or more further decorative layers on the side of the one or more first decorative layers facing away from the carrier ply.

The first decorative ply 3 comprises for example at least one opaque color layer, a metallic layer, which is preferably semi-transparent, brushed and/or high-gloss over the whole surface, or another decorative layer. Further, it is possible that the first decorative ply 3 has a background color layer, in particular on the side of the first decorative ply 3 facing towards the carrier ply 2. It is conceivable that the background color layer is the only layer of the first decorative ply 3.

It is possible here that the first decorative ply 3, in particular for forming the first decoration, comprises one or more decorative layers, wherein the one or more decorative layers have at least one or more of the following layers or a combination of the following layers, in particular arranged in a direction leading away from the carrier ply, in the named sequence: an adhesive layer, a metallic layer, a color layer, a printed layer, a colored varnish layer, a further decorative layer, a protective layer, in particular a protective varnish layer. This further decorative layer in turn preferably comprises one or more of the previously named decorative layers.

The carrier ply 2 is preferably transparent and/or the carrier ply 2 comprises a material or a combination of materials selected from: ABS, ABS/PC, PC/ABS, PC, PP or PMMA. The layer thickness of the carrier ply 2 is for example 0.75 mm. A layer thickness of the carrier ply 2 in the range of from 0.5 mm to 30 mm, in particular in the range of from 0.5 mm to 0.75 mm, is preferably conceivable.

In particular, a use of a decorative film 1 and/or a decorative film body 10 as an insert, hot-stamping film and/or in-mold film, in particular as an in-mold decoration film, insert-molding film, in-mold labeling film and/or print mold design film, is possible.

In particular, the first decorative ply 3 has for example a layer thickness of 0.5 µm. It is possible in particular that the first decorative ply 3 has a layer thickness in a range of from 0.5 µm to 10 µm.

FIG. 4 schematically shows in particular the decorative film 1 shown in FIG. 3, wherein the decorative film 1 comprises a buffer layer 33, which is preferably arranged between the first decorative ply 3 and the carrier ply 2. Here, the buffer layer 33 preferably has been or is applied to the carrier ply 2 over the whole surface. Further, the buffer layer 33 is preferably transparent. The buffer layer 33 is preferably formed as an adhesive layer and/or comprises an adhesive.

FIG. 5 shows in particular the decorative film 1 shown in FIG. 3, wherein the first decorative ply 3 is multi-layered. Here, it is possible that the first decorative ply 3 has a first decorative layer 312, which is single- or multi-layered. The first decorative layer 312 preferably comprises an opaque color layer, in particular an opaque colored varnish layer, and/or a metallic layer. In particular, the first decorative ply 3 has an optional protective layer 311, preferably a protective varnish layer, on the side of the decorative layer 312 facing away from the carrier ply 2. In particular, an optional adhesive layer 313 is arranged between the decorative layer 312 and the carrier ply 2. As FIG. 5 shows, it is thus possible that the first decorative ply 3 preferably has a protective layer 311 on its outer side facing away from the carrier ply 2 and/or has an adhesive layer 313 on its outer side facing towards the carrier ply 2.

Further, it is conceivable that the decorative layer 312 comprises or consists of the background color layer. For example, a decoration, in particular a wood decoration, is formed hereby. It is also possible that the first decorative ply 3 comprises further decorative layers for this purpose. These further decorative layers preferably comprise at least one foreground color layer and/or are applied in particular partially and/or as a pattern, preferably on a side of the decorative layer 312, in particular the background layer, facing away from and/or facing towards the carrier ply 2.

It is also possible that the protective varnish layer has been or is formed different in particular in areas and has high-gloss and matte areas of surface and at the same time areas of surface with a tactile structure or only has two different ones of the above-named areas of surface. Thus, it is possible for example that an outer edge area of the protective varnish layer has been or is formed different from an area surrounded by the edge area. For example, it is possible that the outer edge area of the protective varnish layer has been or is formed matte and/or tactile and preferably the area surrounded by the edge area has been or is in particular formed high-gloss.

FIG. 6 shows the decorative film 1 shown in FIG. 5, wherein the first decorative ply 3 is multi-layered and in particular has several decorative layers 3121 to 3126. Here, the several decorative layers 3121 have the printed layers 3124 to 3126 on their side facing towards the carrier ply 2. It is possible in particular that the printed layers 3124 to 3126 are printed overlapping and/or next to each other.

The decorative layers have the colored varnish layers 3121 to 3123 on their side facing away from the carrier ply 2 and/or between the protective layer 311 and the carrier ply 2. The decorative layers 3121 to 3126, in particular the colored varnish layers 3121 to 3124, here comprise in particular at least one opaque color layer.

It is also possible that, instead of one or more of the colored varnish layers 3121 to 3124 and/or in addition, a metallic layer or a further decorative layer is applied.

With respect to the embodiments of the decorative layers, reference is made in particular to the above statements.

Figure 7:
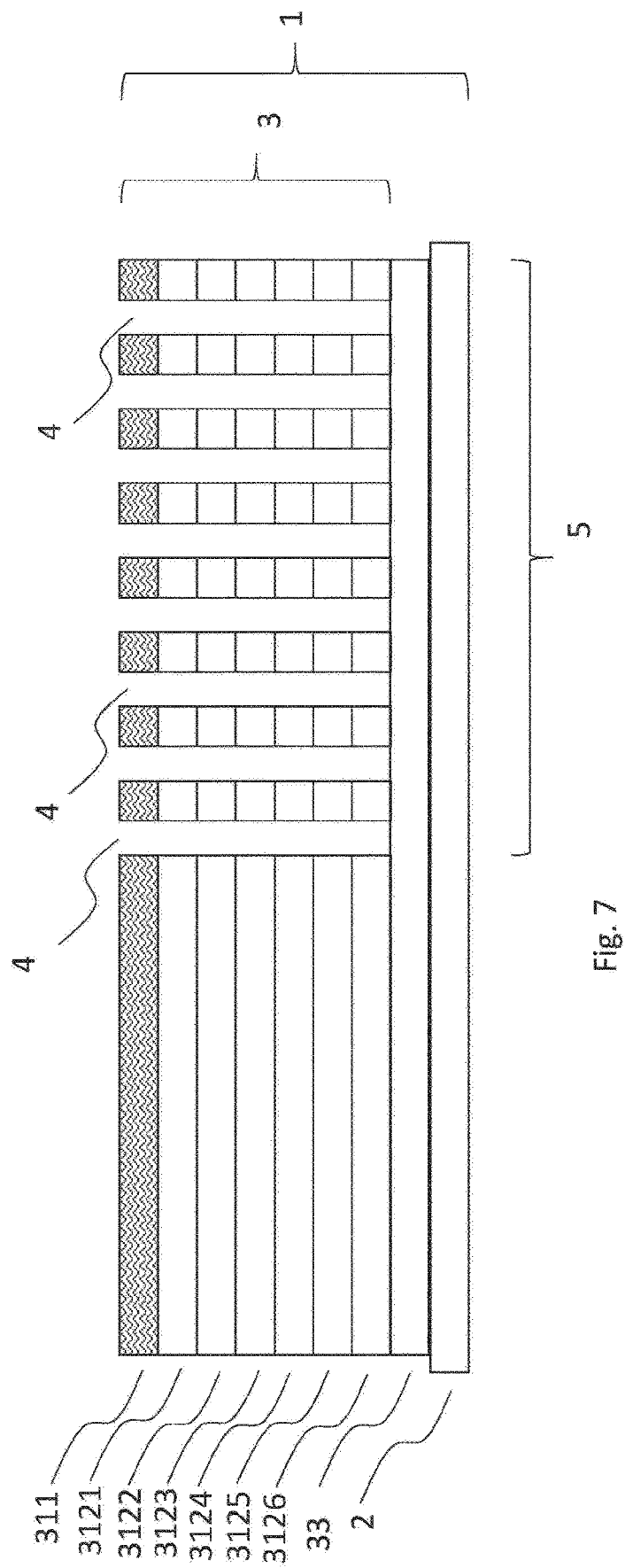

FIG. 7 shows the decorative film 1 shown in FIG. 6, wherein the decorative film 1 has a buffer layer 33, which is in particular also described in FIG. 4, between the decorative ply 3 and the carrier ply 2. Further, the adhesive layer 313 shown in FIG. 6 is in particular not depicted. It is thus possible that the buffer layer 33 replaces the adhesive layer 313. It is further conceivable that the adhesive layer 313 is applied to the buffer layer 2. Further, it is conceivable that a further layer that is over the whole surface and transparent, for example comprising PC and/or PMMA, is arranged on the side of the buffer layer 33 facing away from the carrier ply 2.

Figure 8:
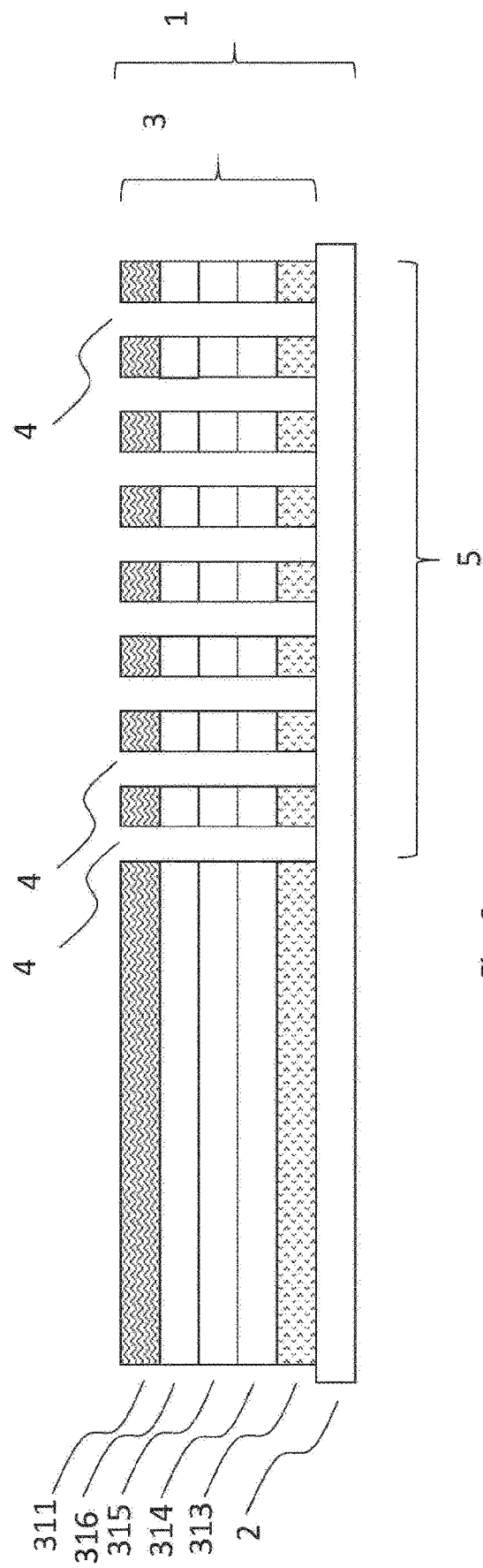

FIG. 8 schematically shows in particular the decorative film 1 shown in FIG. 5, wherein the first decorative ply 3 has a metallic layer 314 and a varnish layer 315. The first decorative ply 3 optionally has the further decorative layer 316, which is single- or multi-layered. The further decorative layer 316 is in particular arranged on the side of the decorative layer 312 facing away from the carrier ply 2 and/or between the decorative layer 312 and the protective layer 311 and/or in particular comprises one or more of the above-named decorative layers.

The metallic layer 314 is in particular transparent, semi-transparent or opaque at least in areas and/or over the whole surface. It is preferably possible that the metallic layer 314 is brushed or high-gloss. Further, it is possible that the metallic layer 314 is applied at least in areas in the form of an island layer, preferably by means of vapor deposition, wherein the metallic layer preferably comprises or consists of indium. The varnish layer 315 is in particular vapor-depositable and/or the metallic layer 314 is vapor-deposited on the varnish layer 315.

The one or more transparent areas 4 are preferably only introduced in the display area 5, in which the dynamically actuatable display 7 has also been arranged or is also attached. In particular, no openings, cuts, gaps and/or holes are thus preferably present in the at least one metallic layer 314 outside the display area 5. At least one sensor is preferably arranged neighboring the display area 5. The metallic layer 314 as an island layer in particular brings with it the above-named properties and/or advantages with respect to the radiation permeability. It is further conceivable that the metallic layer 314 comprises one or more of the above-named metals.

Figure 9A:
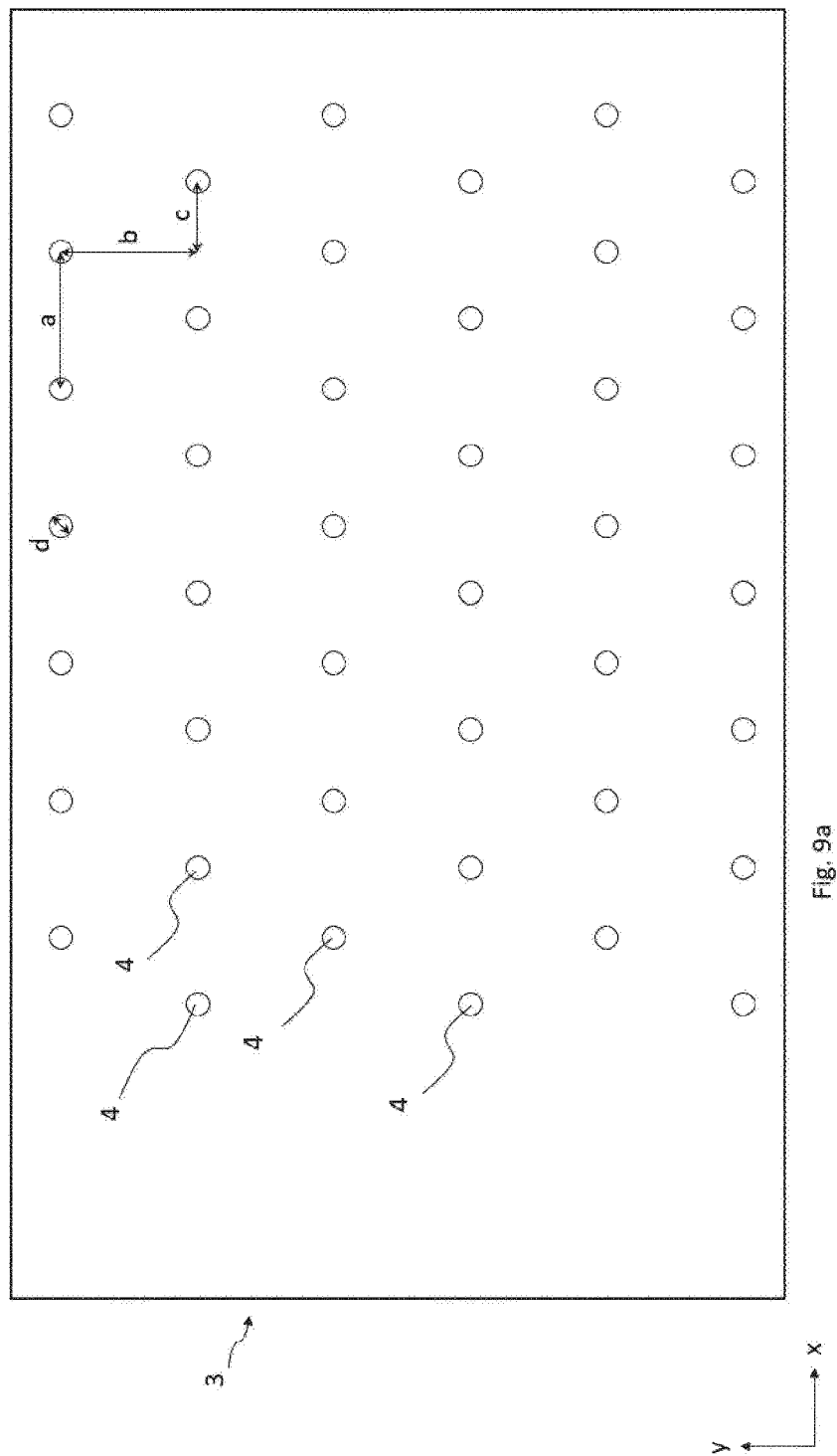

FIG. 9a schematically shows a top view onto the first decorative ply 3 and in particular the decorative film 1 as is shown for example in FIG. 3. The one or more transparent areas 4, in particular in the case of an observation in a top view onto the decorative film 1 and/or onto the first decorative ply 3, are preferably arranged in a grid here.

The transparent areas 4 are in particular arranged in rows arranged parallel to each other. The x direction shown in the coordinate system can be understood in particular as the horizontal direction and the y direction in particular as the vertical direction. The rows here in particular form horizontal lines and/or lines in the x direction and/or are arranged vertically offset relative to each other and/or next to each other in the y direction.

The grid of the one or more transparent areas 4 has in particular a grid width of 3 mm. It is preferably also possible that the grid width lies in a range of from 1 mm to 5 mm. The grid width preferably determines the distance a and/or b between the transparent areas 4. By the grid width is thus meant in particular the distance between directly neighboring transparent areas 4 in the x direction and/or y direction. By grid width is preferably also meant here the horizontal distance and/or vertical distance between directly neighboring transparent areas. To determine the grid width, the horizontal distance and/or the vertical distance, in particular the distance from center to center of directly neighboring transparent areas is measured. It is herewith possible for example that, by means of the one or more transparent areas 4, the first decorative ply 3 forms a preferably uniform and in particular homogeneous shadow mask.

The one or more transparent areas 4 are in particular arranged in rows arranged parallel to each other. Transparent areas 4 arranged in every second row are preferably arranged offset by half of the grid width relative to transparent areas 4 of the respectively neighboring rows in the direction of the row. Half of the grid width is shown here in particular with c. In this example, every second row in the y direction has transparent areas which are arranged offset by c=1.5 mm in the x direction, in particular offset relative to transparent areas of the row preferably lying above it or below it in the y direction.

The one or more transparent areas 4, in particular in a top view onto the first decorative ply 3, in each case form a circular surface in particular. The diameter d here is 0.5 mm. Further, it is possible that the one or more transparent areas 4 preferably have a diameter in the range of from 0.25 mm to 0.75 mm. It is further conceivable that the transparent areas 4 have a shape or a combination of different shapes, for example selected from: circle, ellipse, triangle, quadrangle, polygon, irregular polygon, diamond, cross. Further, the one or more transparent areas 4 have in particular in each case a surface area in a range of from 0.04 mm$^2$ to 0.5 mm$^2$, preferably in a range of from 0.04908 mm$^2$ to 0.44179 mm$^2$, preferably wherein the surface area is measured in a top view onto the first decorative ply 3.

Figure 9B:
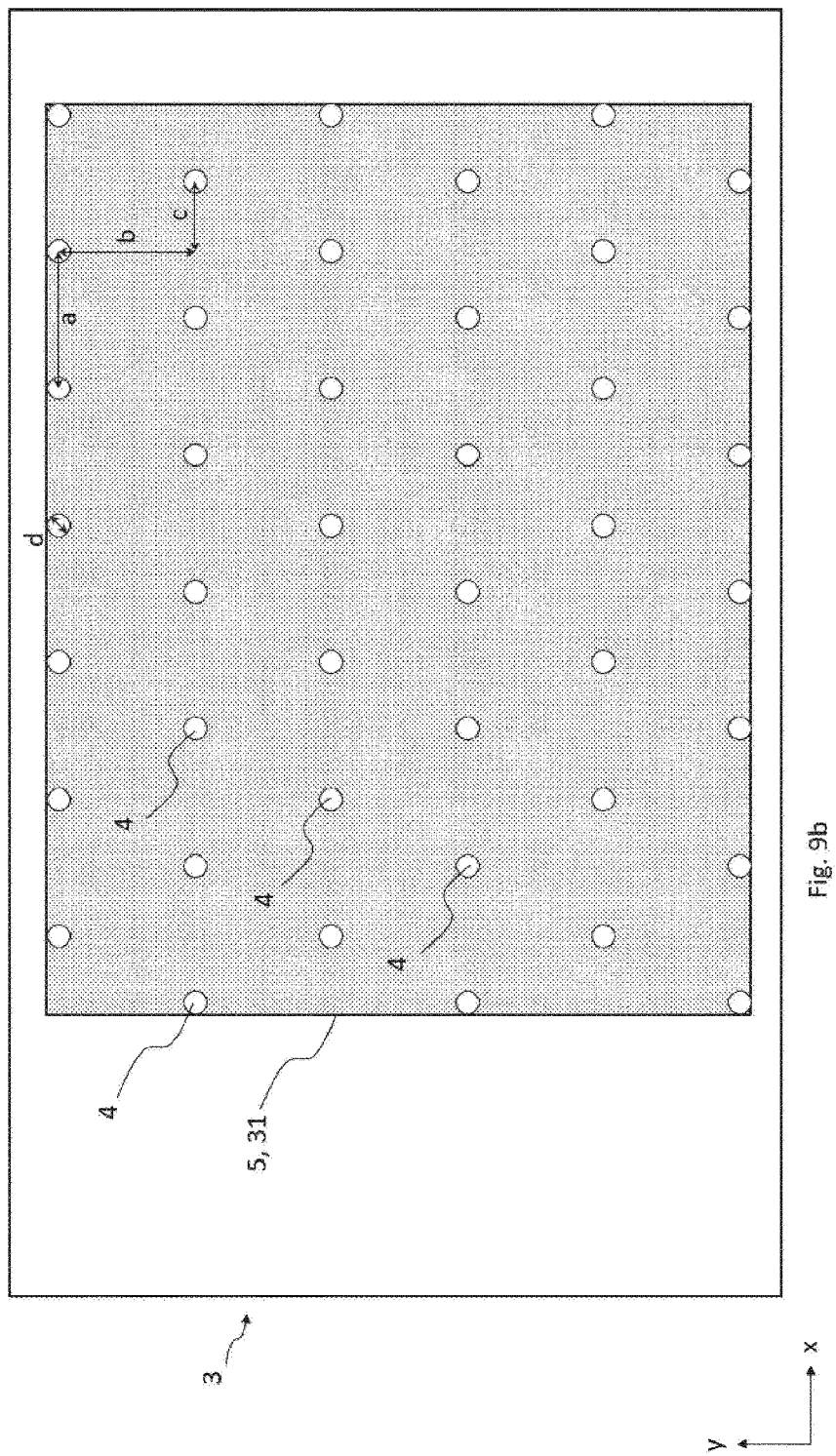

FIG. 9b shows the first decorative ply 3 shown in FIG. 9a, wherein the display area 5 is further shown here, wherein the display area 5 preferably has the decoration 8.

The first decorative ply 3 and/or the first decoration 31 is for example opaque at least in areas or opaque over the whole surface in the display area 5, preferably outside the one or more transparent areas 4. In particular, the first decorative ply 3 has a layer that is opaque at least in areas or preferably has several layers which form for example a multi-layered ply that is opaque at least in areas.

The display area 5, in particular in the case of an observation perpendicular to a plane spanned by the decorative film 1, is preferably delimited by the outline around the transparent areas 4 and/or defined by an area to which the dynamically actuatable display is applied and/or is to be applied. Here, it is also conceivable that the dynamically actuatable display overhangs the area of the display area 5 in a covered area, in particular wherein in the covered area the dynamically actuatable display is concealed by the first decorative ply 3 and/or the first decorative ply 3 preferably does not have any transparent areas in the covered area.

The one or more transparent areas 4 preferably cover a proportion in a range of from 0.5% to 3% of the total surface area of the display area 5. The display area 5 has in particular a surface area in a range of from 0.1 m$^2$ to 1.0 m$^2$.

The transparence in the wavelength range visible to the human eye of the decorative film 1 and/or the first decorative ply 3 in the display area 5 and outside the one or more transparent areas 4 preferably lies in a range of from 10% to 75%, in particular in a range of from 35% to 65%. The transparence in the wavelength range visible to the human eye of the decorative film 1 and/or the first decorative ply 3 inside the one or more transparent areas 4 preferably lies in a range of from 10% to 75%, in particular in a range of from 35% to 65%.

It is possible in particular that the decorative film 1 and/or the first decorative ply 3 has a ratio of the transparence in the visible wavelength range in the display area 5 outside the one or more transparent areas 4 to the transparence in the visible wavelength range of the one or more transparent areas 4 in a range of from 5% to 90%.

Preferably, the decorative film 1 and/or the first decorative ply 3 has a reflectance in the range of from 5% to 90% in the display area 5 and outside the one or more transparent areas 4 and/or has a reflectance in the range of from 20% to 80% inside the one or more transparent areas 4.

It is possible in particular that the decorative film 1, in particular in the case of an observation onto a side of the decorative film 1 facing away from the carrier ply 2, and/or the first decorative ply 3 has a ratio of the reflectance in the display area 5 outside the one or more transparent areas 4 to the reflectance of the one or more transparent areas 4 in a range of from 20% to 80%.

Such reflectances and/or transmittances or transparence values make it possible in particular that a motif generated by means of the dynamically actuatable display is preferably easily visible and/or a motif of the decorative film and/or at least the first decoration can be optically hidden, in particular can be hidden for the human eye. Further, it is made possible in particular that the dynamically actuatable display is better hidden optically.

Further, it is conceivable that outside the display area 5 the first decorative ply 3 and/or the first decoration 31 has a static motif, which preferably surrounds and/or delimits the display area 5, for example in the form of a border, preferably in a color that contrasts with the decoration, in particular with the first decoration 31 and/or with the first motif, inside the display area 5, and/or in the form of a metallization, for example of chrome. It is also possible that outside the display area the first decoration 31 and/or the static motif of the first decorative ply 3 and/or of the first decoration 31 preferably matches the first decoration 31 inside the display area 5 and/or continues it seamlessly and/or transition-free, preferably with the result that the display area 5 as such is not readily discernible, in particular is not readily discernible on the basis of the first decoration 31.

Further, it is possible that the first decorative ply 3 and/or the first decoration 31 is transparent or semi-transparent at least in areas outside the display area 5 and/or is backlit and/or shone through outside the display area, in particular wherein this backlighting and/or shining through can preferably be effected not with the dynamically actuatable display, but with further light-emitting elements.

FIG. 10*a* schematically shows an example of a decorative film body 10 for application to a dynamically actuatable display 7 with the decorative film 1.

The decorative film body 10 in particular comprises a further decorative ply 8. The further decorative ply 8 is preferably applied to a side of the first decorative ply 3 facing away from the carrier ply 2. The further decorative ply 8 is preferably applied to the first decorative ply 3 over the whole surface. The further decorative ply 8 is in particular applied to the first decorative ply 3 over the whole surface. It is also possible that the further decorative ply 8 covers the first decorative ply 3, for example in the case where a spacer body, preferably consisting of an injection-molding material, is arranged between the further decorative ply 8 and the first decorative ply 3. Further, it is conceivable that the further decorative ply 8 covers the one or more transparent areas 4. The coverage is preferably over the whole surface here.

The further decorative ply 8 is expediently semi-transparent at least in areas or over the whole surface and/or has a transparence in the wavelength range visible to the human eye in a range of from 5% to 100%, in particular in a range of from 20% to 80%, at least in areas or over the whole surface. Further, it is possible that the further decorative ply 8 and/or the decorative film body 10, in particular in the case of an observation from the side of the further decorative ply 8, has a reflectance in the range of from 1% to 99% in the display area 5 and outside the one or more transparent areas 4 and/or in the range of from 1% to 99% in the one or more transparent areas 4.

It is possible that the further decorative ply 8 has a second decoration 310, wherein the second decoration 310 forms a static motif or a second partial area of the first motif, preferably at least in the display area 5. It is thus preferably possible that the second decoration 310 with the first decoration 31 forms a static motif or a third partial area of a static motif. In particular, the one or more transparent areas 4, preferably with the dynamically actuatable display in the switched-off state, with the third partial area form a static motif.

It is also conceivable that the further decorative ply 8, in particular for forming the second decoration 310, comprises one or more decorative layers. With respect to the embodiments of the decorative layers, reference is made in particular to the above statements.

In particular, the further decorative ply 8 has for example a layer thickness of 5 μm. It is possible in particular that the further decorative ply 8 preferably has a layer thickness in a range of from 0.5 μm to 30 μm.

The first decorative ply 3 preferably has colors with wavelengths in the range of from 380 nm to 550 nm and/or has colors and/or optical effects which are selected individually or in combination from: natural wood tones, metallic silver tones, tones from gold via red gold to copper colors, in particular matte to high-gloss, preferably with and/or without brushing. The further decorative ply has in particular colors with wavelengths in the range of from 380 nm to 550 nm and/or colors and/or optical effects which are selected individually or in combination from: natural wood tones, metallic silver tones, tones from gold via red gold to copper colors.

Such combinations of colors and/or optical effects preferably improve the possibility of optically hiding the first motif and/or in particular of representing the second motif with an improved quality.

It is also conceivable that the further decorative ply 8 preferably has a homogeneous color and/or transparence, preferably over the whole surface.

FIG. 10*b* shows the decorative film body 10 shown in FIG. 10*a*, wherein the further decorative ply 8 here is applied in particular to a side of the carrier ply 2 facing away from the first decorative ply 3.

Figure 10C:
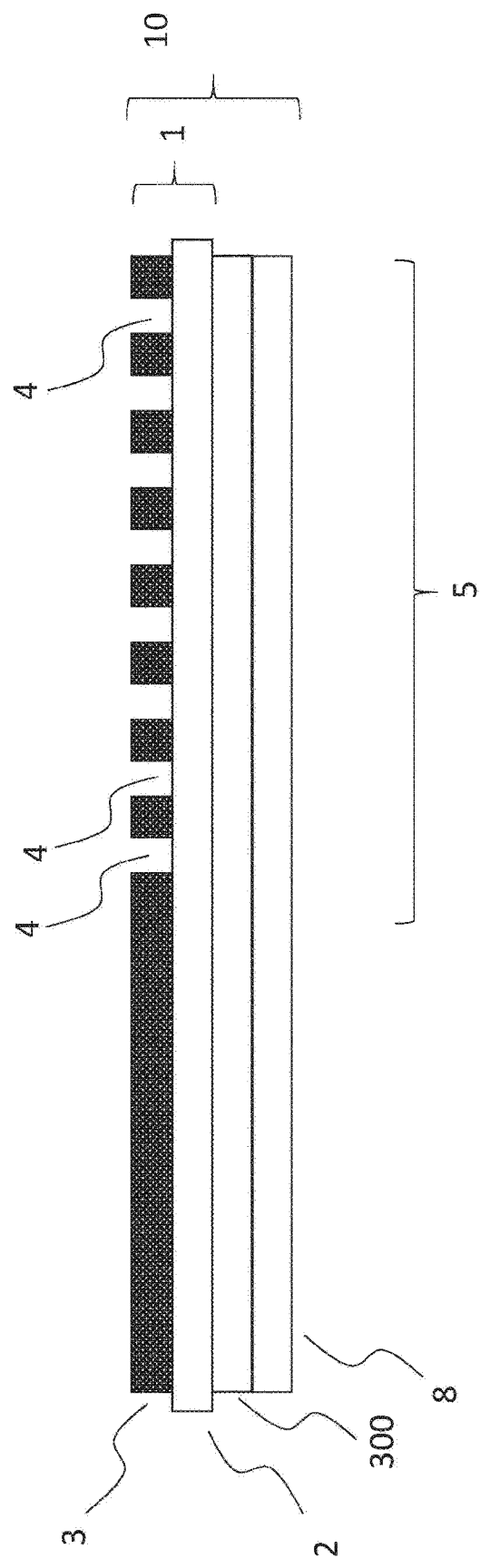

FIG. 10*c* schematically shows a decorative film body 10 with a further decorative ply 8, such as is also described for example in FIG. 10*a*, wherein a spacer body 300 is arranged between the further decorative ply 8 and the first decorative ply 3. Here, it is possible in particular that the spacer body 300 comprises or consists of an injection-molding material. The spacer body 300 is preferably semi-transparent or transparent. In particular, the spacer body 300 preferably has a transparence in a range of from 15% to 80%. The spacer body preferably has a thickness in the range of from 1 mm to 20 mm, preferably in the range of from 4 mm to 20 mm.

The dynamically actuatable display is here preferably applied to the side of the first decorative ply 3 of the decorative film body 10 and/or the side of the first decorative ply 3 of the decorative film body 10 is preferably provided for application of the dynamically actuatable display.

Further, it is possible that the further decorative ply 8 has a carrier ply which is preferably arranged on the side of the further decorative ply 8 facing away from the first decorative ply 3. It is possible here that the further decorative ply 8 has one or more further layers, wherein the further carrier ply of the further decorative ply 8 is detachable from the one or more further layers of the further decorative ply 8.

FIG. 11*a* shows the decorative film 1 shown in FIG. 3, wherein the decorative film 1 has an optional further protective layer 99 on the side of the carrier ply 2 opposite the first decorative ply 3. The further protective layer 99 is in particular transparent. The further protective layer 99 preferably comprises or consists of PU and/or is applied to the carrier ply 2 by means of PU flooding. Further, it is possible that the further protective layer 99 is a wet varnish and/or is applied to the carrier ply 2 by means of wet varnishing. It is also possible that the further protective layer 99 is a film, in particular a transfer ply of a transfer film or a laminating film, and/or is applied to the carrier ply 2 by means of film application. Further, it is conceivable that the further decorative ply 8 is arranged instead of the protective layer 99.

FIG. 11*b* shows the decorative film 1 shown in FIG. 11*a*, wherein the decorative film 1 further has a color layer 333. The protective layer 99 is optional. The color layer 333 is applied to the first decorative ply 3 and the one or more transparent areas 4 over the whole surface. The color layer 333 is preferably transparent or semi-transparent and/or has a transparence in the range of from 15% to 80%. The first decorative ply 3 here preferably comprises or consists of a barrier varnish layer 34. Here, the barrier varnish layer 34 is for example an opaque color layer. The layer 32 is preferably an optional adhesive layer, which is in particular transparent over the whole surface. It is also conceivable that the layer 32 is not present or is a buffer layer, which is preferably transparent over the whole surface. The color layer 33 here also acts in particular as a protective layer.

Here, it is possible in particular that the first decorative ply 3 is applied to the carrier ply 2 from a transfer film. In particular, the color layer 333 is applied to a detachment layer of a carrier ply of the transfer film and the barrier varnish layer 34 is preferably applied to the color layer 33. Here, it is possible that the one or more transparent areas 4 are already generated in the transfer film. It is also possible in particular that the color layer 333 is formed by the further decorative ply 8 or the further decorative ply 8 is applied instead of the color layer 333.

Figure 12:
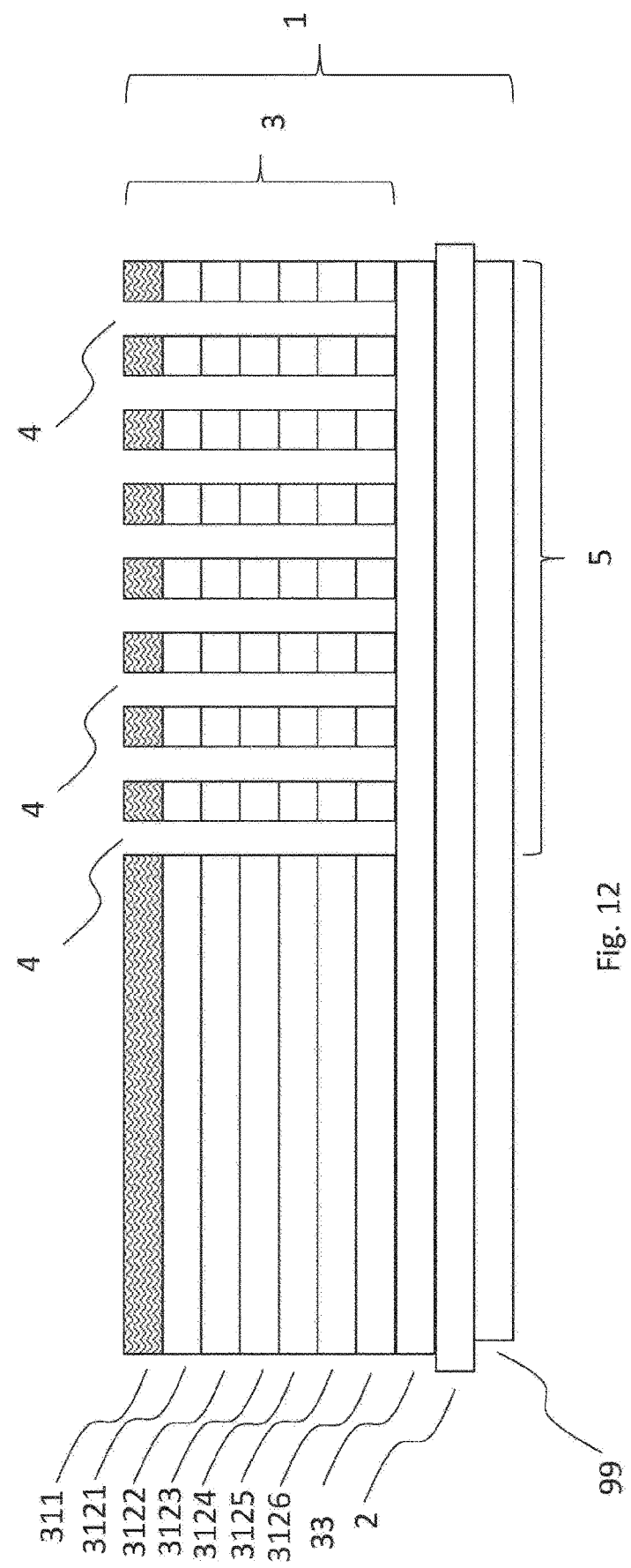

FIG. 12 shows the decorative film 1 shown in FIG. 6, wherein the decorative film 1 has the further protective layer 99 described in relation to FIG. 11*a* on the side of the carrier ply 2 opposite the first decorative ply 3.

FIG. 13*a* and FIG. 13*b* schematically show examples of a display body 20. In particular, the display body 20 comprises the decorative film 1 shown in FIG. 3, wherein the decorative film 1 is applied to a dynamically actuatable display 7. As is shown in FIG. 13*a* and FIG. 13*b*, it is possible that the dynamically actuatable display 7 is arranged on a side of the decorative film 1 which, in particular starting from a contact surface between the carrier ply 2 and the first decorative ply 3, is arranged facing towards or facing away from the first decorative ply 3.

Figure 13C:
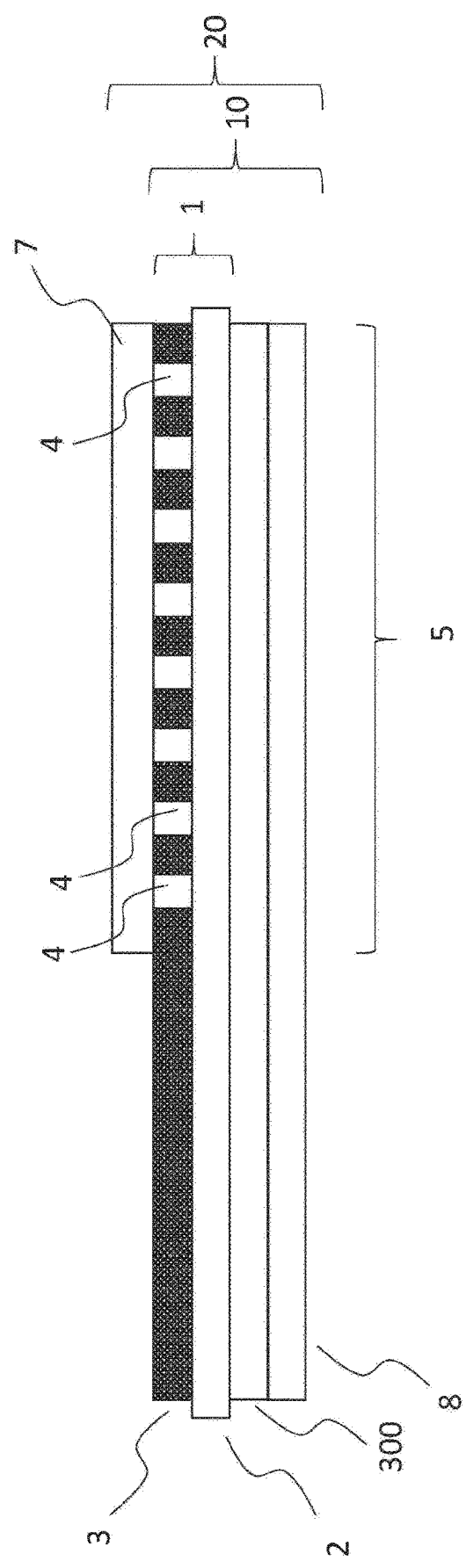

FIG. 13*c* shows a display body with the decorative film body 10 shown in FIG. 10*c*. By way of example, the dynamically actuatable display 7 is applied to the side of the decorative film body 10 facing away from the further decorative ply 8.

In FIG. 13*a*, FIG. 13*b* and FIG. 13*c* the dynamically actuatable display 7 is applied in particular such that the light emitted by the dynamically actuatable display 7 is aimed in the direction of the decorative film 1, in particular in the direction of the one or more transparent areas 4.

Figure 14A:
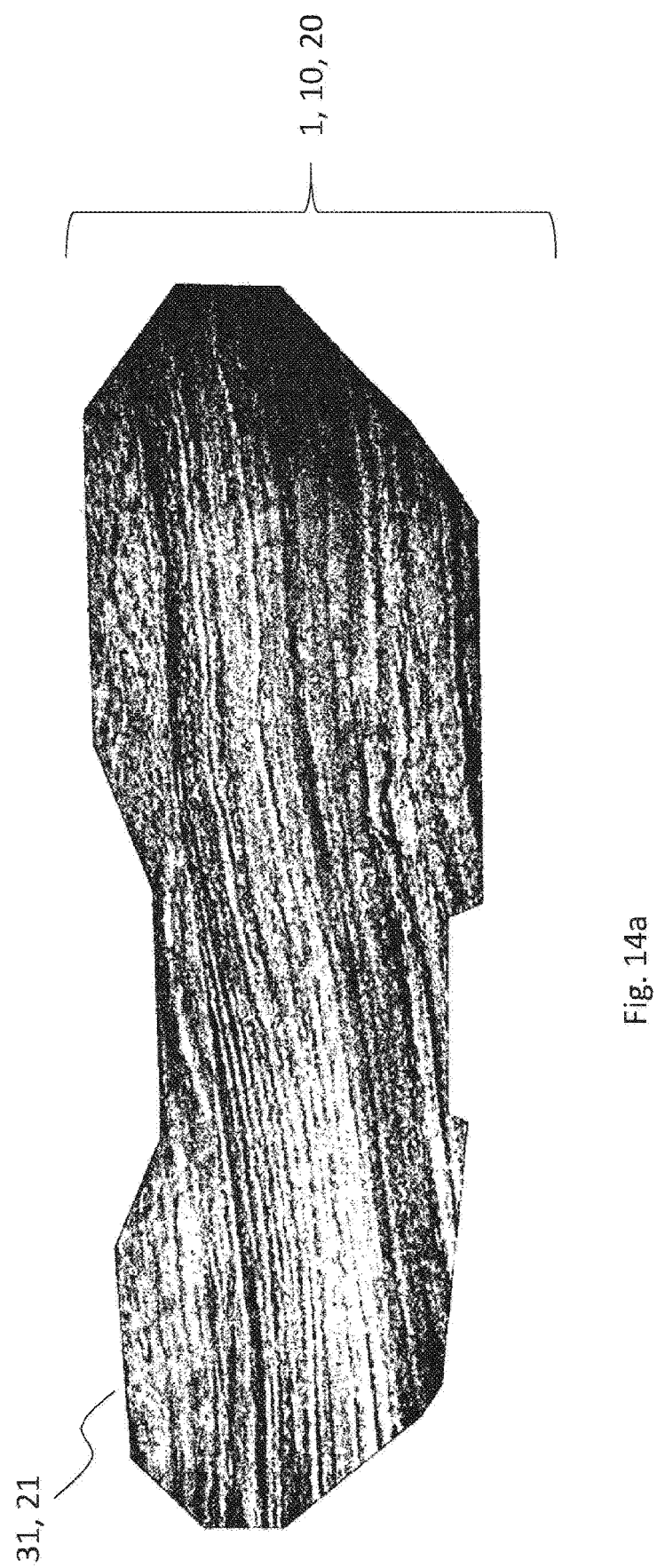

FIG. 14*a* shows by way of example a possible top view onto the decorative film 1, the decorative film body 10 and/or the display body 20 in the switched-off state of the dynamically actuatable display 7.

FIG. 14*a* further shows the motif 21, which is in particular a static motif. The motif 21 here is generated in particular at least by partial areas of the first decorative ply 3, the further decorative ply 8, the one or more transparent areas 4 and/or the dynamically actuatable display 7, for example by the first, second and/or third partial area, in the switched-off state. For example, it is conceivable that in particular the dynamically actuatable display 7 in the switched-off state forms a black tone of a wood motif in the one or more transparent areas 4, wherein the first decorative ply and/or the further decorative ply 8 or in particular different decorative layers of the first decorative ply preferably form different brown tones for example. In the example shown here, the motif 21 is thus preferably a motif with the optical appearance of wood. The decorative film 1 thus shows for example a first decoration 31 in the form of a wood decoration, which is visible to the human observer in particular in the case of an observation in reflected light. The first motif 21 is in particular a static motif, which has at most or not more than one image change per second, preferably at most or not more than 5 image changes per second.

By means of at least the first decorative ply 3 and/or the first decoration 31, the first motif 21 or a first partial area of the first motif 21 can thus preferably be put in a state that is visible to the human eye without the aid of optical equipment, as FIG. 14*a* shows, for example by switching the dynamically actuatable display off and/or attaching it in the switched-off state. The first motif 21 is in particular discernible for the human eye in reflected light, preferably in the case of an observation onto the decorative film 1, the decorative film body 10 and/or the display body 20, in particular from a side of the first decorative ply 3 starting from the carrier ply 2 or the dynamically actuatable display 7. The decorative film 1 and/or the decorative film body 10 preferably is not or is only slightly shone through, preferably is not illuminated and/or shone through more strongly from a side opposite the observation side than with a luminous density of 30 cd/m$^2$. The luminous density of the incident light onto the decorative film 1 and/or the decorative film body from the observation side is preferably not more than 10,000 cd/m$^2$.

Figure 14B:
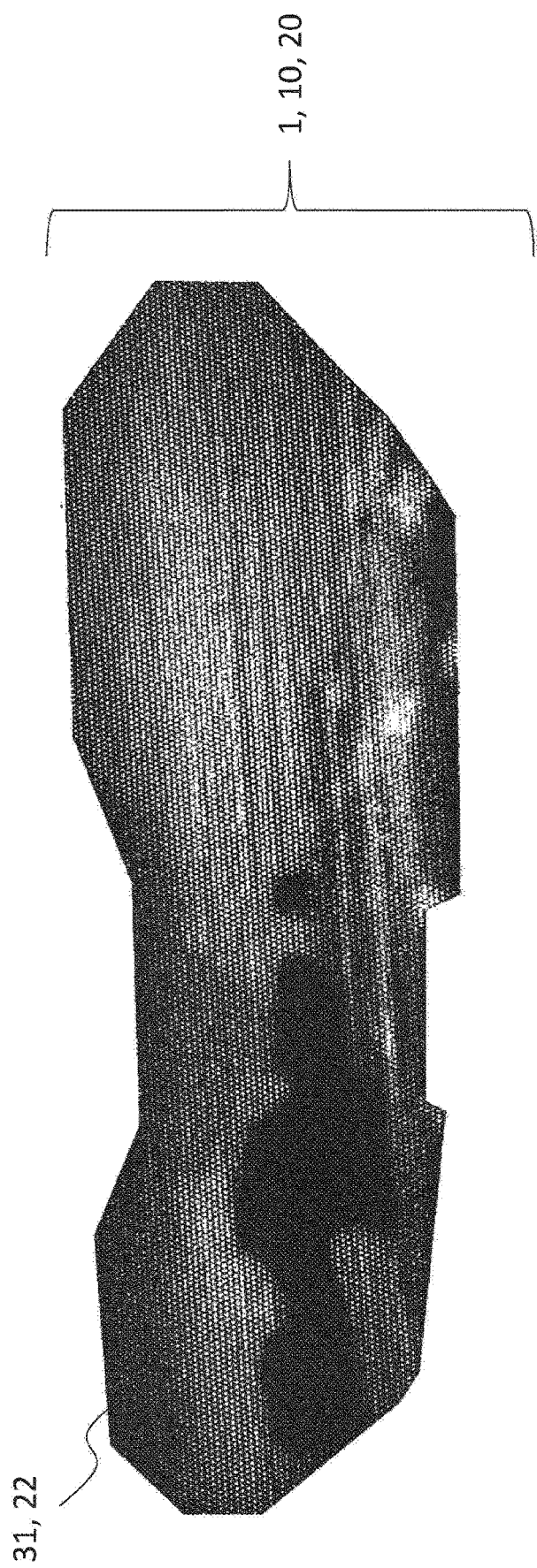

FIG. 14*b* shows the display body 20, as it is shown in particular in FIG. 13*a*, FIG. 13*b*, FIG. 13*c* and/or FIG. 14*a*, in the switched-on state of the display 7. It is thus possible that the dynamically actuatable display 7 can be put in a switched-off state and a switched-on state. In the switched-on state of the dynamically actuatable display, it is possible for example that the above-described first motif 21, shown in particular in FIG. 14*a*, is optically hidden. For example, the second motif 22, as it can be seen in FIG. 14*b*, is now shown.

It is thus possible that, in the case of an observation of the display body 20 from the side of the decorative film 1, the display area 5 in the switched-off state of the dynamically actuatable display 7 has a first motif 21, which is in particular discernible for the human eye and which is a static motif. As is shown in particular in FIG. 14*a*, the dynamically actuatable display 7 is in particular optically hidden.

Preferably, as is shown in particular in FIG. 14*b*, the first decoration 31 is present in the decorative film 1, in particular wherein the first decoration 31 and/or the first motif 21 can be or is optically hidden by the second motif 22.

It is advantageously possible that, in the case of an observation of the display body from the side of the decorative film 1, the display area 5 in the switched-on state of the dynamically actuatable display 7 generates a second motif 22, which is in particular discernible for the human eye. The second motif 22 is in particular dynamically alterable and/or is a dynamic motif. For example, the second motif 22 is a video, a movie and/or an animation and/or has at least one image change per second, preferably at least or more than five image changes per second.

The observation distance, preferably at which the second motif 22 is discernible, preferably is particularly easily discernible, and/or the second motif 22 optically hides the first motif 21, is preferably greater than 2.8 m. Further, it is possible that the dynamically actuatable display 7 is optically hidden at a distance greater than 2.8 m. The dimensions of the one or more transparent areas 4 for example preferably lie below the resolving power of the human eye, in particular at a distance of at least 2.8 m.

It is preferably also conceivable that the second motif 21 in particular does not have a static motif and/or that, in particular in the switched-on state of the dynamically actuatable display 7, the display body 20 preferably does not form or generate a static motif, in particular by optically hiding the first motif 21 with the second motif 22, wherein the second motif 22 preferably has exclusively one or more dynamic motifs.

The observation angle in the case of an observation of the display body 20 from the side of the decorative film 1, at which the second motif 22 is particularly easily discernible and/or the second motif 22 hides the first motif 21 for the human eye, in particular lies in a range of from −80° to 80°, further preferably in a range of from −70° to 70°, preferably wherein the observation angle in the case of an observation perpendicular to the decorative film 1 and/or the display body 20 has an angle of 0°. In particular in the case of such an observation, the second motif 22 is particularly easily discernible and/or the first motif 21 is optically hidden, in particular optically hidden by the second motif 22, and/or the dynamically actuatable display 7 is optically hidden in the switched-off state. The decorative film 1 and/or the display body 20 herewith have advantageous properties in particular in fields of application with a substantial proportion of such observation properties.

It is expedient here that, in the switched-off state of the dynamically actuatable display 7 in the case of an observation of the display body 20 from the side of the decorative film 1, the display body 20 has a reflectance in the range of from 5% to 90% in the display area 5 and outside the one or more transparent areas 4 and/or has a reflectance in the range of from 20% to 80% inside the one or more transparent areas 4. Further, it is possible that, in the switched-off state of the dynamically actuatable display 7 in the case of an observation of the display body 20 from the side of the decorative film 1, the ratio of the reflectance in the display area 5 outside the one or more transparent areas 4 to the reflectance in the one or more transparent areas 4 in the switched-off state of the dynamically actuatable display 7 lies in a range of from 5% to 90%, in particular in a range of from 40% to 70%. By an observation from the side of the decorative film 1 is meant here in particular an observation which does not take place on the back of the dynamically actuatable display 7.

The dynamically actuatable display 7 is preferably a color display. For example, the dynamically actuatable display has grayscales with a color depth of 14 bits. It is also possible that the dynamically actuatable display 7 has a color depth and/or grayscales in the range of from 8 bits to 48 bits.

The dynamically actuatable display 7 has for example a luminous density of 1,000 cd/m$^2$. It has in particular proved to be advantageous that the dynamically actuatable display 7 has a luminous density of at least 300 cd/m$^2$, in particular at least 500 cd/m$^2$. The dynamically actuatable display 7 has for example a contrast ratio of 5,000:1. In particular, it is expedient that the dynamically actuatable display 7 has a contrast ratio of at least 2,000:1 and/or in a range of from 2,000:1 to 10,000:1.

The abbreviation "cd" preferably stands for candela. Details with respect to the brightness and/or luminous density are preferably also given in nits. Here, in particular, 1,000 nits=1,000 cd/m$^2$.

In particular, the values of the luminous density and of the contrast ratio relate to a measurement during which the display has not yet been applied to the decorative film or the decorative film body.

Further, it is possible that the dynamically actuatable display 7 has light-emitting elements.

The light-emitting elements are expediently arranged in a grid, in particular with a grid width in a range of from 0.5 mm to 10 mm, preferably in a range of from 1 mm to 10 mm.

In particular, the light-emitting elements are arranged partially or completely overlapping the one or more transparent areas 4 and/or in the one or more transparent areas 4. Further, it is possible that the distance, preferably measured from center to center, between two directly neighboring light-emitting elements is a whole-number multiple of the grid width of the one or more transparent areas 4 or the grid width of the one or more transparent areas 4 is a whole-number multiple of the distance between two directly neighboring light-emitting elements.

Further, it is possible that the dynamically actuatable display 7 has a light matrix, preferably consisting of light-emitting elements, in particular with light-emitting elements in the form of mini-LEDs and/or micro-LEDs. It is further possible that the dynamically actuatable display 7 is an OLED display and in particular that the layers forming the OLED are arranged on a flexible substrate. It is thereby possible that the display is deformable and/or has been or is deformed three-dimensionally or two-and-a-half-dimensionally. It is also possible that the dynamically actuatable display 7 has light-emitting elements in the form of pixels. For example, the dynamically actuatable display 7 here has a pixel density of 125,910 px/m$^2$.

In particular, it is possible that the light matrix with a plurality of light-emitting elements has an external shape, in particular in the form of a rectangular shape, as a freeform or in the form of a circle, an ellipse, a triangle or a polygon. The external shape is in particular an outline shape around the outer light-emitting elements of the light matrix. It is additionally or alternatively possible that the external shape of the light matrix has been or is covered by means of an additional opaque mask layer with transparent cutout such that as a result the light matrix preferably has the appearance of the external shape of the transparent cutout. For example, it is conceivable that a rectangular light matrix is or has been covered with a mask with triangular transparent cutout, such that as a result the light matrix has a triangular appearance. In other words, the additional opaque mask layer has been or is arranged in particular in an area which comprises the external shape of the light matrix, preferably wherein the additional opaque mask layer is opaque in this area and is transparent within an area enclosed by this area.

The light-emitting elements preferably have a width in the range of from 1.5 mm to 3 mm and/or a length in the range of from 1.5 mm to 3 mm. In particular, the light-emitting elements have in each case a surface area in the range of from 2.25 mm$^2$ to 9 mm$^2$.

It is in particular conceivable that the dynamically actuatable display 7 has a density of the light-emitting elements in the range of from 4,000 light-emitting elements per m$^2$ to 12,000 light-emitting elements per m$^2$. The display preferably has a pixel period and/or a pitch of 2.82 mm. In particular, a pixel period and/or a pitch in a range of from 1.5 mm to 3 mm is conceivable. The refresh rate of the dynamically actuatable display 7 preferably lies in a range of from 25 Hz to 200 Hz, preferably in a range of from 40 Hz to 100 Hz.

The dynamically actuatable display 7 has for example a display element with a length of 496 mm, a width of 496 mm and a depth of 55 mm. It is also conceivable that the dynamically actuatable display 7 has at least one display element with a length and/or width in the range of from 100 mm to 1,500 mm. Further, it is possible that the at least one display element 7 has a depth in the range of from 5 mm to 55 mm. Further, it is conceivable that the dynamically actuatable display comprises several display elements, in particular with the named dimensions. The at least one display element is in particular flat or 2D or 2.5D or 3D curved.

The resolution of the dynamically actuatable display is for example 176×176 px. Further, it is conceivable that the resolution of the dynamically actuatable display 7 and/or the at least one display element is preferably at least 24 px×24 px or lies in a range of from 12×12 px to 350×350 px.

The dynamically actuatable display 7 preferably has a distance from the first decorative ply 3 and/or the carrier ply 2 in a range of from 3 mm to 30 mm, preferably in a range of from 5 mm to 15 mm, wherein the distance is preferably a maximum distance. For example, the distance, in particular the maximum distance, here is preferably 5 mm.

It is also possible that the switched-off state and the switched-on state of the dynamically actuatable display 7 is activatable and deactivatable by means of an electronic control component and/or that the dynamically actuatable display 7 is dynamically actuatable by means of an electronic control component.

The control component expediently has a storage medium in which, in particular by means of a digital data set, preferably in a digital video format, the actuation of the dynamically actuatable display 7 to generate a dynamic motif, in particular the second motif 22, is defined. The digital video format is present for example in the MPEG, MOV, AVI, WMV, FLV, MKV format.

The second motif 22, in particular the video, the animation and/or the movie, is preferably optimized on the decorative film 1 and/or the decorative film body 10. It is possible in particular that the digital data set takes account of and/or comprises decoration data about the decorative film 1 and/or the decorative film body 10 which are used in particular to actuate the dynamically actuatable display 7. The decoration data comprise and/or take account of for example values of the transparence and/or the color in various areas of the decorative film 1 and/or the decorative film body 10.

It is possible here that the decoration data and/or the various areas are allocated to light-emitting elements, whereby in particular the luminous density and/or color of the light-emitting elements is adapted corresponding to the respective decoration data.

Further, it is possible that the control component comprises at least one sensor, in particular at least one brightness sensor, proximity sensor and/or touch sensor. It is possible for example that, by means of the at least one sensor, a signal is generated and processed such that the control component switches the dynamically actuatable display 7 on and in particular actuates the dynamically actuatable display 7 by means of the digital data set on the storage medium such that the second motif 22, preferably in the form of a dynamic motif, is generated and/or the dynamically actuatable display 7 is switched off.

Further, it is possible, in particular in the case where the control component has a touch sensor, that the first decoration 3, the first motif 21 and/or the second motif 22 have or include one or more patterns, preferably symbols, which preferably indicate corresponding touch functions. In particular, it is possible in the second motif 22 to provide a symbol which indicate the stopping and continuation of the second motif 22 or other control possibilities and preferably make them possible by means of a touch function.

In particular, the touch sensor has been or is arranged completely or only partially overlapping the dynamically actuatable display 7 or alternatively arranged not overlapping the dynamically actuatable display 7, thus preferably arranged neighboring the dynamically actuatable display 7. Further, it is possible that, neighboring the dynamically actuatable display 7, a control area is provided in which touch functions are present which can serve in particular to control the dynamically actuatable display 7 and/or to control other functions, for example in the case where the touch sensor is preferably arranged neighboring the dynamically actuatable display 7.

Figure 14C:
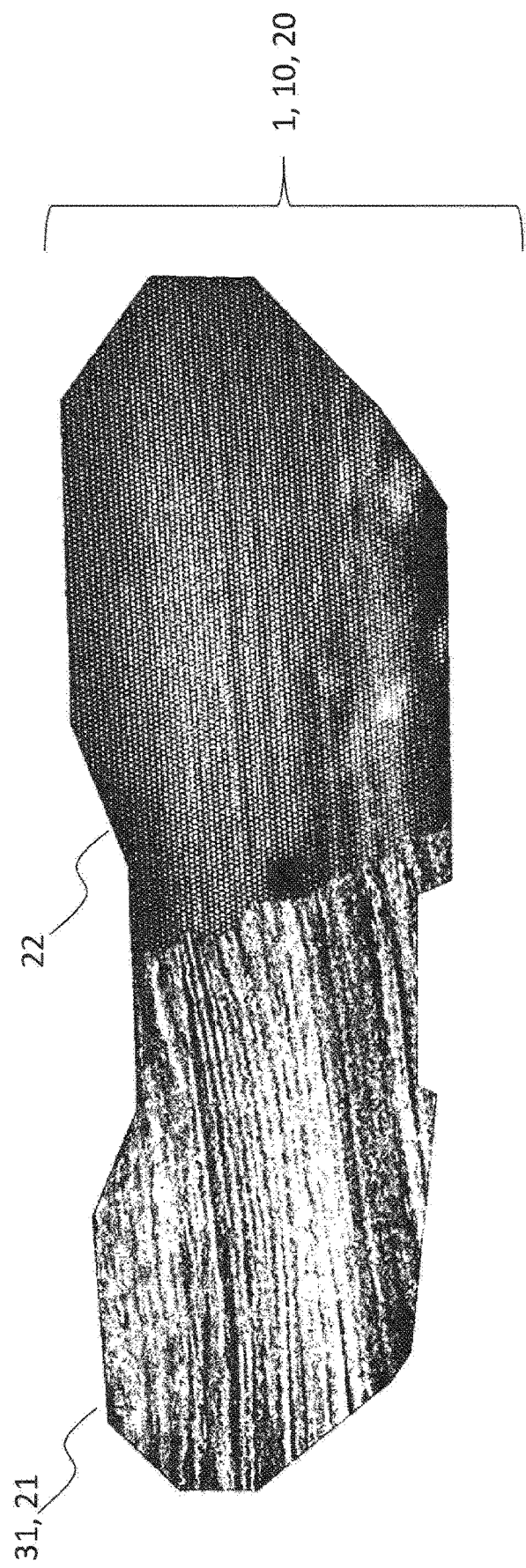

FIG. 14c shows in particular that in the switched-on state of the dynamically actuatable display 7 the display body 20 can show or shows the first motif 21 at least in areas and the second motif 22 at least in areas. It is thus also possible that the display area 5 in the switched-on state of the dynamically actuatable display 7 has a static and a dynamic motif. It is thus possible that the display area 5 in the switched-on state of the dynamically actuatable display 7 has the first motif 21 or a partial area of the first motif 21 in a first area and has the second motif 22 or a partial area of the second motif 22 in a second area, wherein the first and the second area preferably do not overlap.

FIG. 15a schematically shows a display body 20, which has been or is produced preferably by means of injection molding and/or die casting. Here, the spacer body 300 is in particular injected between the first decorative ply 3 and the further decorative ply 8 by means of injection molding. The display body 20 shown in relation to FIG. 15a has been or is produced in particular as described in FIG. 1d. The further decorative ply 8 preferably forms a side of the display body facing towards an observer when the display body is in use and/or a front side of the display body.

For producing the decorative film body 20, a method with the following steps is in particular conceivable, in particular in the specified sequence:

providing the decorative film 1 with the first decorative ply 3, generating the one or more transparent areas 4 in the decorative film 1 and/or the first decorative ply 3, providing a further decorative film with the further decorative ply 8;

placing the first decorative ply 3 and the further decorative ply 8 in an injection mold with a first and a second mold half, which together form a cavity for molding the decorative film body 20, wherein the decorative film 1 is attached to a first wall of the cavity and the further decorative film is attached to a second wall of the cavity opposite the first wall;

back-injection molding the decorative film 1 and the further decorative film with an injection-molding material, with the result that the decorative film 1 forms a first surface and the second decorative film forms a second surface of the decorative film body 20 opposite the first surface.

In a further step, the dynamically actuatable display 7 is preferably joined to the decorative film body 10. It is also conceivable that the dynamically actuatable display 7 represents the second wall at least in areas and is joined to the decorative film body, in particular to the second surface of the decorative film body 10, during the back-injection molding.

It is possible that the further decorative ply 8 is formed similar to the first decorative ply 3. In particular, the further decorative ply 8 preferably has at least one ply made of a colorless or colored transparent or translucent thermoplastic material, in particular of ABS, ABS/PC, PC/ABS, PC, PP or PMMA. This preferably acts as a carrier ply for the one or more further layers, in particular in the form of one or more decorative layers, of the further decorative ply 8. With respect to the embodiment of the one or more further decorative layers, reference is made in particular to the above statements.

The one or more further layers, in particular in the form of one or more decorative layers, of the further decorative ply 8 preferably comprise at least one protective varnish layer that is high-gloss or matte and/or provided with a tactile structure. The protective varnish layer is preferably colorless or colored translucent or transparent or also has opaque areas.

Further, it is possible that the first and/or further decorative ply 1, 8 is preferably deep drawn before being placed in the injection mold. So-called inserts can thereby preferably be generated which, before the back-injection molding, can in particular be three-dimensionally deformed comparatively strongly, such as is often not possible during the back-injection molding.

Here, for example, usual deep-drawing methods are used. It is possible that the first and/or further decorative ply 1, 8 is provided in the form of sheets and is placed in a deep-drawing die which has the desired final contour. Through the application of heat, preferably with a temperature of from 80° C. to 200° C., the first and/or further decorative ply 1, 8 is preferably made deformable. In particular, the first and/or further decorative ply is then adapted to the shape of the deep-drawing die by application of vacuum and/or by application of a form punch and/or positive air pressure and is thus preferably brought to the desired final contour. During cooling, the material of the first and/or further decorative ply 1, 8 then preferably cures again, with the result that it preferably retains the final contour.

To form the tactile structure during the back-injection molding, an in particular tactile surface relief is preferably molded into the surface of the further decorative ply 8 facing away from the injection-molding material, in particular on the basis of a pattern layer which is arranged between the wall of the cavity and a carrier film, the further carrier ply of the further decorative ply 8 or the further decorative ply 8.

The tactile structure thus preferably forms during the injection molding if the further decorative ply 8 is plastically deformable due to the heat and pressure of the injected injection-molding material. The pattern layer has been or is formed preferably directly by the wall of the cavity or provided preferably by a separate inlay, in particular by the carrier film, and/or further carrier ply of the further decorative ply 8 itself.

FIG. 15*b* shows a display body, which is preferably produced by applying the dynamically actuatable display 7 to the decorative film 1. It is possible in particular that the dynamically actuatable display 7 has been or is fastened to the first decorative ply 3 by means of mechanical fastening, for example by means of clips and/or screws and/or by means of back-injection molding and/or insert molding. Further, it is conceivable that the dynamically actuatable display 7 is fastened to the carrier ply 2 by means of mechanical fastening, for example by means of clips and/or screws and/or by means of back-injection molding and/or insert molding.

A display body 20 and/or a decorative film body 10 is in particular used as one of or in one of the following articles:
vehicle exterior part, in particular front panel, preferably radiator grille, side panel, preferably B pillar, rear panel, paneling and/or roof attachment, preferably as an advertisement, information display and/or warning,
vehicle interior part, in particular as a dashboard, dashboard element, door panel, door panel element, warning and/or information display,
household appliance, in particular refrigerator, washing machine, dishwasher and/or cooker
piece of furniture,
information display, in particular advertisement.

LIST OF REFERENCE NUMBERS 1 decorative film
2 carrier ply
3 first decorative ply
31 first decoration
310 second decoration
311 protective layer
312 decorative layer
3121, 3122, 3123, 333 colored varnish layers
3124, 3125, 3126 printed layer
313 adhesive layer
314 metallic layer
315 varnish layer
316 further decorative layer
32 adhesive layer
33 buffer layer
34 barrier varnish layer
4 transparent area
5 display area
6 laser
7 display
8 further decorative ply
91, 92, 93 steps
10 decorative film body
20 display body
21 first motif
22 second motif
210 control component

The invention claimed is:

1. A decorative film for application to a dynamically actuatable display, comprising:
a carrier ply,
a first decorative ply,
wherein, in a display area, the first decorative ply has a first decoration and one or more transparent areas, in which the decorative film is permeable to light emitted by the dynamically actuatable display, and
wherein the one or more transparent areas are arranged in a grid, and
wherein the one or more transparent areas, in each case have a surface area in a range of from 0.04 mm$^2$ to 0.5 mm$^2$ and/or the one or more transparent areas cover a proportion in a range of from 0.5% to 3% of the total surface area of the display area.

2. The decorative film according to claim 1, wherein the first decorative ply and/or the first decoration is opaque or semi-transparent at least in areas or over the whole surface.

3. The decorative film according to claim 1, wherein the first decorative ply and/or the first decoration provides a first motif or a first partial area of a first motif, wherein the first motif is a static motif.

4. The decorative film according to claim 1, wherein the grid of the one or more transparent areas has a grid width in a range of from 1 mm to 5 mm.

5. The decorative film according to claim 4, wherein the one or more transparent areas are arranged in rows arranged parallel to each other, wherein transparent areas arranged in every second row are arranged offset by half of the grid width relative to transparent areas of the respectively neighboring rows in the direction of the row.

6. The decorative film according to claim 1, wherein the one or more transparent areas, in each case form a circular surface and/or have a diameter in the range of from 0.25 mm to 0.75 mm.

7. The decorative film according to claim 1, wherein the decorative film and/or the first decorative ply has a ratio of the transparence in the visible wavelength range in the display area outside the one or more transparent areas to the transparence in the visible wavelength range of the one or more transparent areas in a range of from 5% to 90%.

8. The decorative film according to claim 1, wherein the decorative film and/or the first decorative ply has a reflectance in the range of from 5% to 90% in the display area and outside the one or more transparent areas and/or has a reflectance in the range of from 20% to 80% inside the one or more transparent areas.

9. The decorative film according to claim 1, wherein the decorative film, and/or the first decorative ply has a ratio of the reflectance in the display area outside the one or more transparent areas to the reflectance of the one or more transparent areas in a range of from 20% to 80%.

10. The decorative film according to claim 1, wherein the first decorative ply, has one or more first decorative layers.

11. The decorative film according to claim 10, wherein at least one first decorative layer of the one or more first decorative layers is a color layer.

12. The decorative film according to claim 11, wherein at least one second decorative layer of the one or more first decorative layers is an opaque color layer and/or a metallic layer.

13. The decorative film according to claim 1, wherein the first decorative ply has a protective layer on its outer side facing away from the carrier ply.

14. The decorative film according to claim 1, wherein the first decorative ply has an adhesive layer on its outer side facing towards the carrier ply.

15. The decorative film according to claim 1, wherein the decorative film comprises a buffer layer, between the first decorative ply and the carrier ply.

16. The decorative film according to claim 1, wherein the first decorative ply has at least one metallic layer.

17. The decorative film according to claim 16, wherein the at least one metallic layer is applied at least in areas in the form of an island layer.

18. A decorative film body for application to a dynamically actuatable display, the decorative film body comprising the decorative film according to claim 1, and wherein the decorative film body comprises a further decorative ply.

19. The decorative film body according to claim 18, wherein the further decorative ply is applied to the first decorative ply over the whole surface and/or covers the first decorative ply and/or covers the one or more transparent areas.

20. The decorative film body according to claim 18, wherein the further decorative ply is semi-transparent at least in areas or over the whole surface and/or has a transparence in the wavelength range visible to the human eye in a range of from 5% to 100%, at least in areas or over the whole surface.

21. The decorative film body according to claim 18, wherein the further decorative ply has a second decoration, wherein the second decoration provides a static motif or a second partial area of the first motif.

22. The decorative film body according to claim 18, wherein the further decorative ply comprises one or more decorative layers.

23. A decorative film body for application to a dynamically actuatable display, the decorative film body comprising a decorative film, the decorative film comprising:
a carrier ply; and
a first decorative ply,
wherein, in a display area, the first decorative ply has a first decoration and one or more transparent areas, in which the decorative film is permeable to light emitted by the dynamically actuatable display, and
wherein the decorative film body comprises a further decorative ply, and wherein a spacer body is arranged between the further decorative ply and the first decorative ply and/or the carrier ply.

24. The decorative film body according to claim 23, wherein the spacer body comprises or consists of an injection-molding material.

25. A display body comprising a dynamically actuatable display and a decorative film or comprising a dynamically actuatable display and a decorative film body, the decorative film comprising:
a carrier ply; and
a first decorative ply, wherein, in a display area, the first decorative ply has a first decoration and one or more transparent areas, in which the decorative film is permeable to light emitted by the dynamically actuatable display, and
the decorative film body comprising:
a carrier ply;
a first decorative ply, wherein, in a display area, the first decorative ply has a first decoration and one or more transparent areas, in which the decorative film is permeable to light emitted by the dynamically actuatable display; and
a further decorative ply,
wherein the one or more transparent areas are arranged in a grid, and
wherein the one or more transparent areas, in each case have a surface area in a range of from 0.04 mm$^2$ to 0.5 mm$^2$ and/or the one or more transparent areas cover a proportion in a range of from 0.5% to 3% of the total surface area of the display area.

26. The display body according to claim 25, wherein the dynamically actuatable display can be put in a switched-off state and a switched-on state.

27. The display body according to claim 25, wherein, in the switched-off state of the dynamically actuatable display in the case of an observation of the display body from the side of the decorative film, the display body has a reflectance in the range of from 5% to 90% in the display area and outside the one or more transparent areas and/or has a reflectance in the range of from 20% to 80% inside the one or more transparent areas.

28. The display body according to claim 25, wherein, in the switched-off state of the dynamically actuatable display in the case of an observation of the display body from the side of the decorative film, the ratio of the reflectance in the display area outside the one or more transparent areas to the reflectance in the one or more transparent areas lies in a range of from 5% to 90%.

29. The display body according to claim 25, wherein, in the case of an observation of the display body from the side of the decorative film, the display area in the switched-off state of the dynamically actuatable display forms a first motif which is a static motif.

30. The display body according to claim 25, wherein, in the case of an observation of the display body from the side of the decorative film, the display area in the switched-on state of the dynamically actuatable display has a second motif which is dynamically alterable and/or is a dynamic motif.

31. The display body according to claim 25, wherein the dynamically actuatable display has a luminous density of at least 300 cd/m$^2$.

32. The display body according to claim 25, wherein the dynamically actuatable display has light-emitting elements.

33. The display body according to claim 32, wherein the light-emitting elements are arranged partially or completely overlapping the one or more transparent areas and/or in the one or more transparent areas.

34. The display body according to claim 32, wherein the light-emitting elements have a width in the range of from 1.5 mm to 3 mm and/or a length in the range of from 1.5 mm to 3 mm and/or in each case have a surface area in the range of from 2.25 mm$^2$ to 9 mm$^2$.

35. The display body according to claim 32, wherein the light-emitting elements are arranged in a grid.

36. The display body according to claim 32, wherein the dynamically actuatable display has a light matrix.

37. The display body according to claim 32, wherein the dynamically actuatable display has light-emitting elements in the form of pixels.

38. The display body according to claim 32, wherein the dynamically actuatable display has a density of the light-emitting elements in the range of from 4,000 light-emitting elements per m$^2$ to 12,000 light-emitting elements per m$^2$.

39. The display body according to claim 25, wherein the dynamically actuatable display has a color depth and/or grayscales in the range of from 8 bits to 48 bits.

40. The display body according to claim 25, wherein the dynamically actuatable display has a distance from the first decorative ply and/or the carrier ply in a range of from 3 mm to 30 mm.

41. The display body according to claim 25, wherein the switched-off state and the switched-on state of the dynamically actuatable display is activatable and deactivatable by means of an electronic control component and/or wherein the dynamically actuatable display is dynamically actuatable by means of an electronic control component.

42. The display body according to claim 41, wherein the control component has a storage medium in which the actuation of the dynamically actuatable display to generate a dynamic motif is defined.

43. The display body according to claim 41, wherein the control component comprises at least one sensor.

44. A method for producing a decorative film for application to a dynamically actuatable display comprising the following steps:
providing a carrier ply;
applying a first decorative ply to the carrier ply, wherein the first decorative ply has a first decoration in a display area; and
generating one or more transparent areas in the display area, wherein, in the one or more transparent areas, the decorative film is permeable to light emitted by the dynamically actuatable display,
wherein the one or more transparent areas are arranged in a grid, and
wherein the one or more transparent areas, in each case have a surface area in a range of from 0.04 mm$^2$ to 0.5 mm$^2$ and/or the one or more transparent areas cover a proportion in a range of from 0.5% to 3% of the total surface area of the display area.

45. The method according to claim 44, wherein the one or more transparent areas are generated by means of lasers and/or lift-off.

46. The method according to claim 44, wherein the first decorative ply is produced using a printing process.

47. The method according to claim 44, wherein the first decorative ply is stamped and/or printed onto the carrier ply.

48. The method according to claim 44, wherein the first decorative ply is joined to a further decorative ply.

49. A method for producing a decorative film for application to a dynamically actuatable display comprising the following steps:
providing a carrier ply;
applying a first decorative ply to the carrier ply, wherein the first decorative ply has a first decoration in a display area; and
generating one or more transparent areas in the display area, wherein, in the one or more transparent areas, the decorative film is permeable to light emitted by the dynamically actuatable display,
wherein the first decorative ply is joined to a further decorative ply, and
wherein a spacer body is injected between the first decorative ply and the further decorative ply by means of an injection-molding material and/or the first decorative ply is back-injection molded by an injection-molding material together with the further decorative ply.

50. The method according to claim 48, wherein the further decorative ply is applied to the first decorative ply over the whole surface and/or covers the first decorative ply and/or covers the one or more transparent areas.

51. A method for producing a display body comprising the following steps:
providing a decorative film or a decorative film body, the decorative film comprising a carrier ply and a first decorative ply, and the decorative film body comprising a carrier ply, a first decorative ply and a further decorative ply, wherein, in a display area, the first decorative ply has a first decoration and one or more transparent areas, in which the decorative film is permeable to light emitted by the dynamically actuatable display,
joining the decorative film or the decorative film body to a dynamically actuatable display,
wherein the one or more transparent areas are arranged in a grid, and
wherein the one or more transparent areas, in each case have a surface area in a range of from 0.04 mm$^2$ to 0.5 mm$^2$ and/or the one or more transparent areas cover a proportion in a range of from 0.5% to 3% of the total surface area of the display area.

52. A decorative film for application to a dynamically actuatable display, comprising:
a carrier ply;
a first decorative ply;
a second decorative ply; and
a spacer body arranged between the second decorative ply and the first decorative ply and/or the carrier ply,
wherein, in a display area, the first decorative ply has a first decoration and one or more transparent areas, in which the decorative film is permeable to light emitted by the dynamically actuatable display.

53. The decorative film according to claim 52, wherein the one or more transparent areas are arranged in a grid.

54. The decorative film according to claim 52, wherein the one or more transparent areas, in each case have a surface area in a range of from 0.04 mm$^2$ to 0.5 mm$^2$.

55. The decorative film according to claim 52, wherein the one or more transparent areas cover a proportion in a range of from 0.5% to 3% of the total surface area of the display area.

56. A display body comprising a dynamically actuatable display and a decorative film body, the decorative film body comprising:
a carrier ply;
a first decorative ply, wherein, in a display area, the first decorative ply has a first decoration and one or more transparent areas, in which the decorative film body is permeable to light emitted by the dynamically actuatable display;

a second decorative ply; and a spacer body arranged between the second decorative ply and the first decorative ply and/or the carrier ply.

57. A method for producing a display body comprising the following steps:

providing a decorative film body, the decorative film body comprising a carrier ply, a first decorative ply and a second decorative ply, wherein, in a display area, the first decorative ply has a first decoration and one or more transparent areas, in which the decorative film body is permeable to light emitted by the dynamically actuatable display;

injecting a spacer body between the first decorative ply and the second decorative ply by means of an injection-molding material; and joining the decorative film body to a dynamically actuatable display.

\* \* \* \* \*